March 1, 1966  C. E. BATES ET AL  3,237,711
AUDIOMETRIC TESTING APPARATUS
Filed March 9, 1962  9 Sheets-Sheet 1

INVENTORS
*CHARLES E. BATES*
BY *HILDING L. BERGQUIST*
*Carlsen & Carlsen*
ATTORNEYS

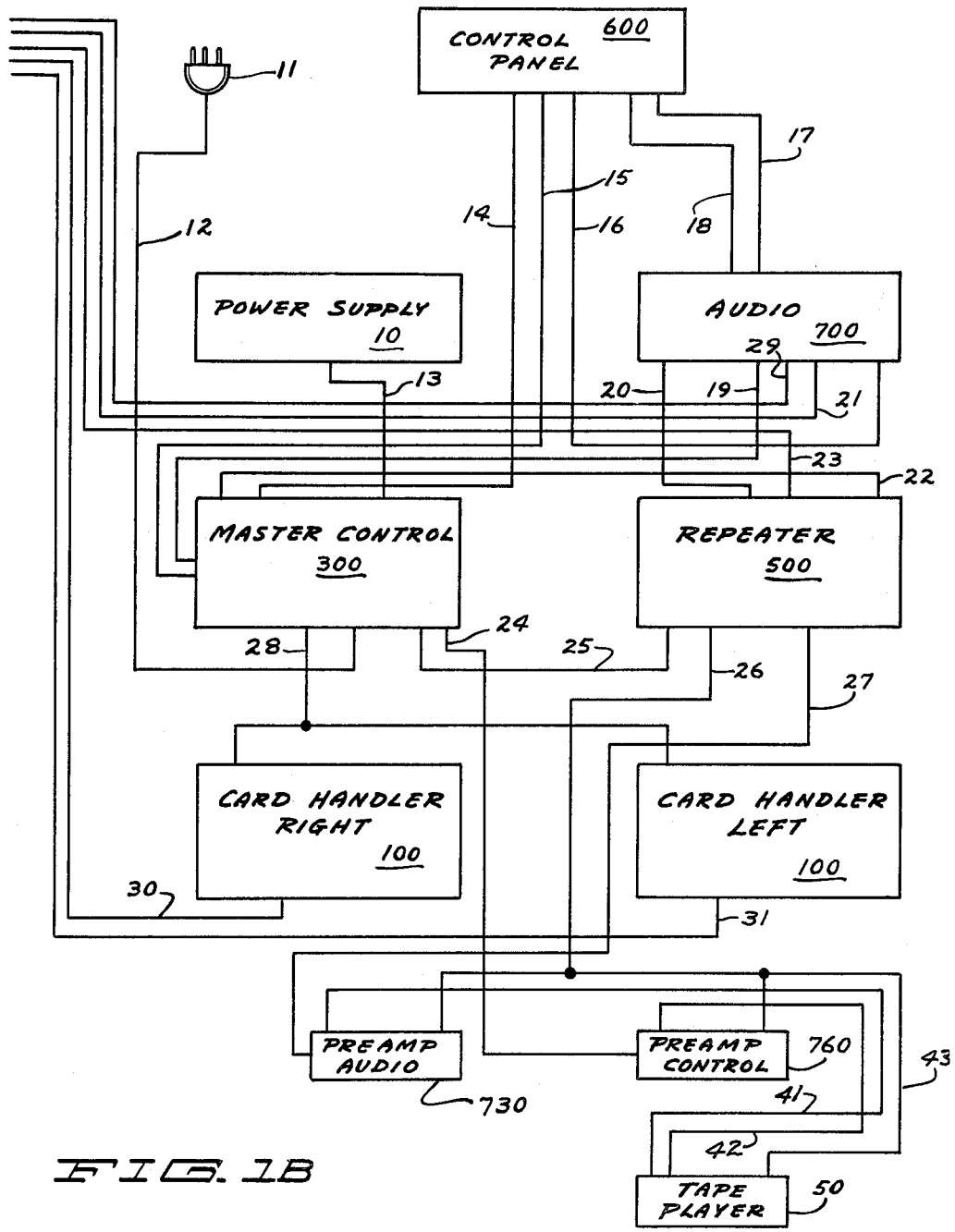

March 1, 1966  C. E. BATES ET AL  3,237,711
AUDIOMETRIC TESTING APPARATUS
Filed March 9, 1962  9 Sheets-Sheet 3
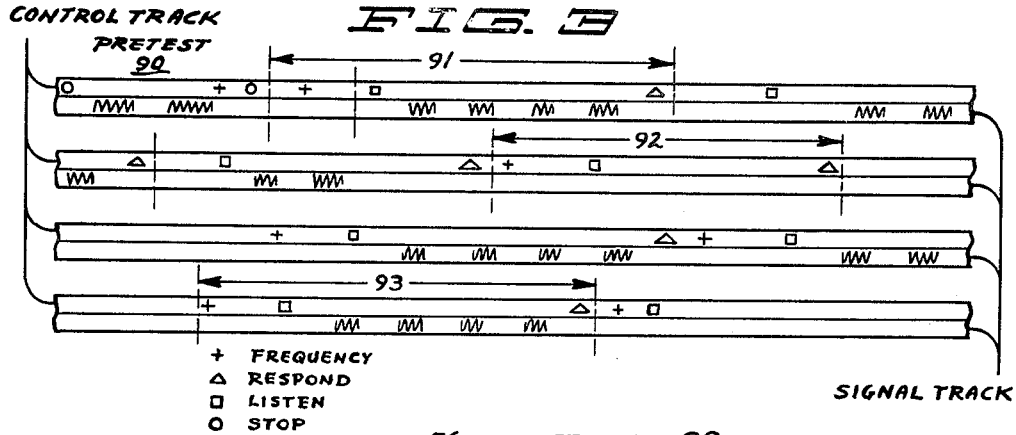
+ FREQUENCY
△ RESPOND
□ LISTEN
○ STOP
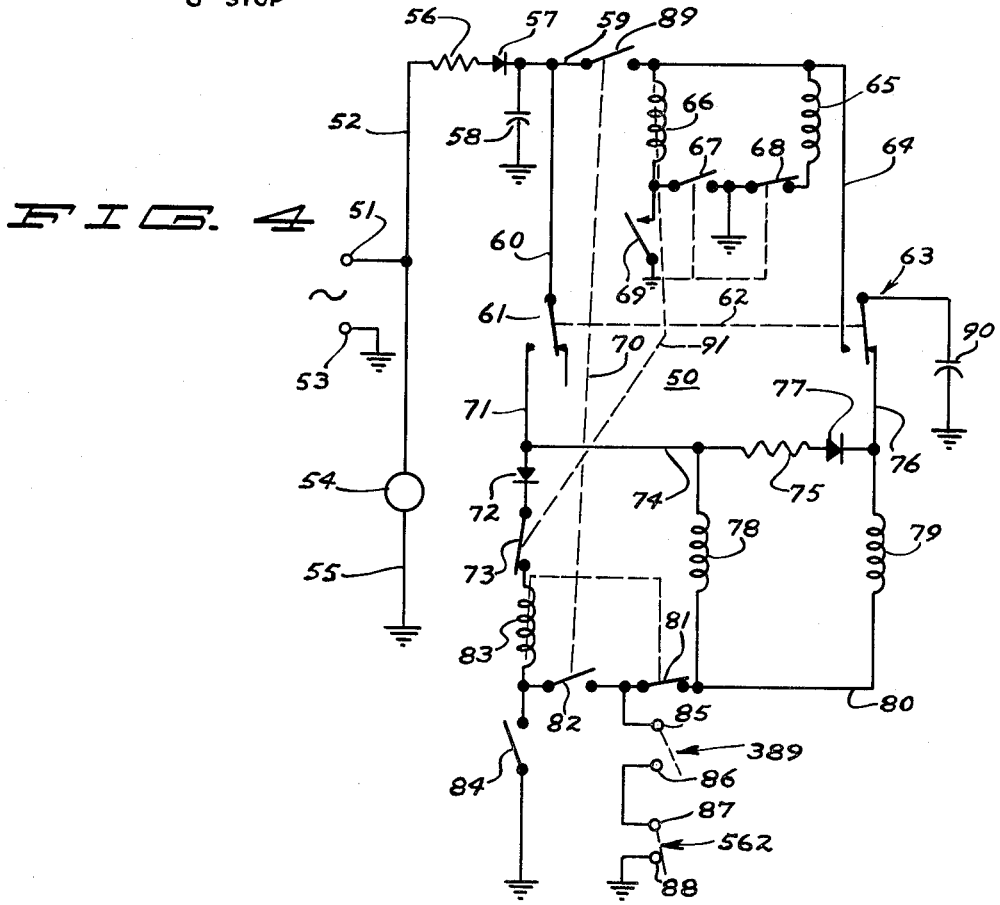
INVENTORS
CHARLES E. BATES
BY HILDING L. BERGQUIST
Carlsen & Carlsen
ATTORNEYS

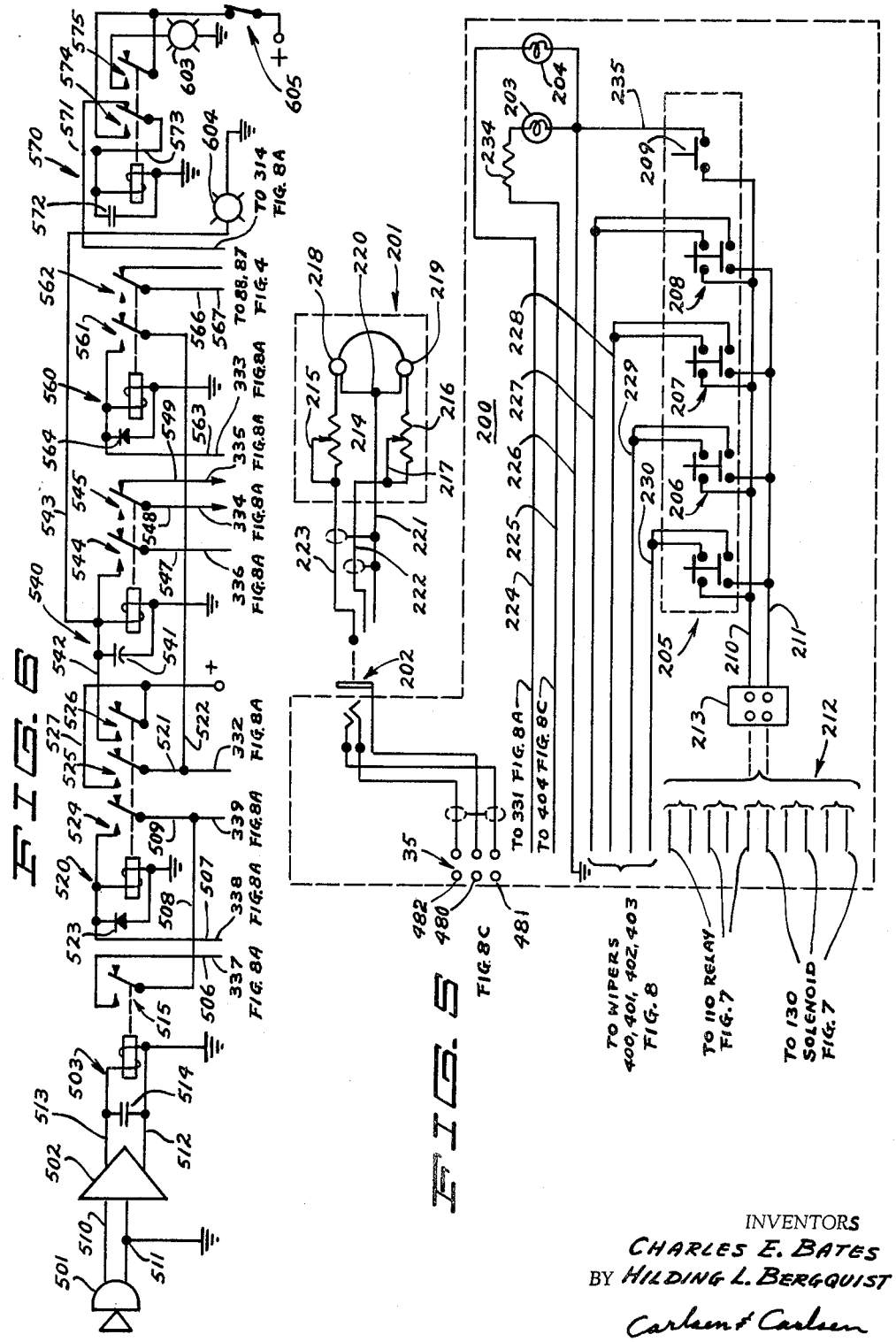

INVENTORS
CHARLES E. BATES
BY HILDING L. BERGQUIST
Carlsen & Carlsen
ATTORNEYS

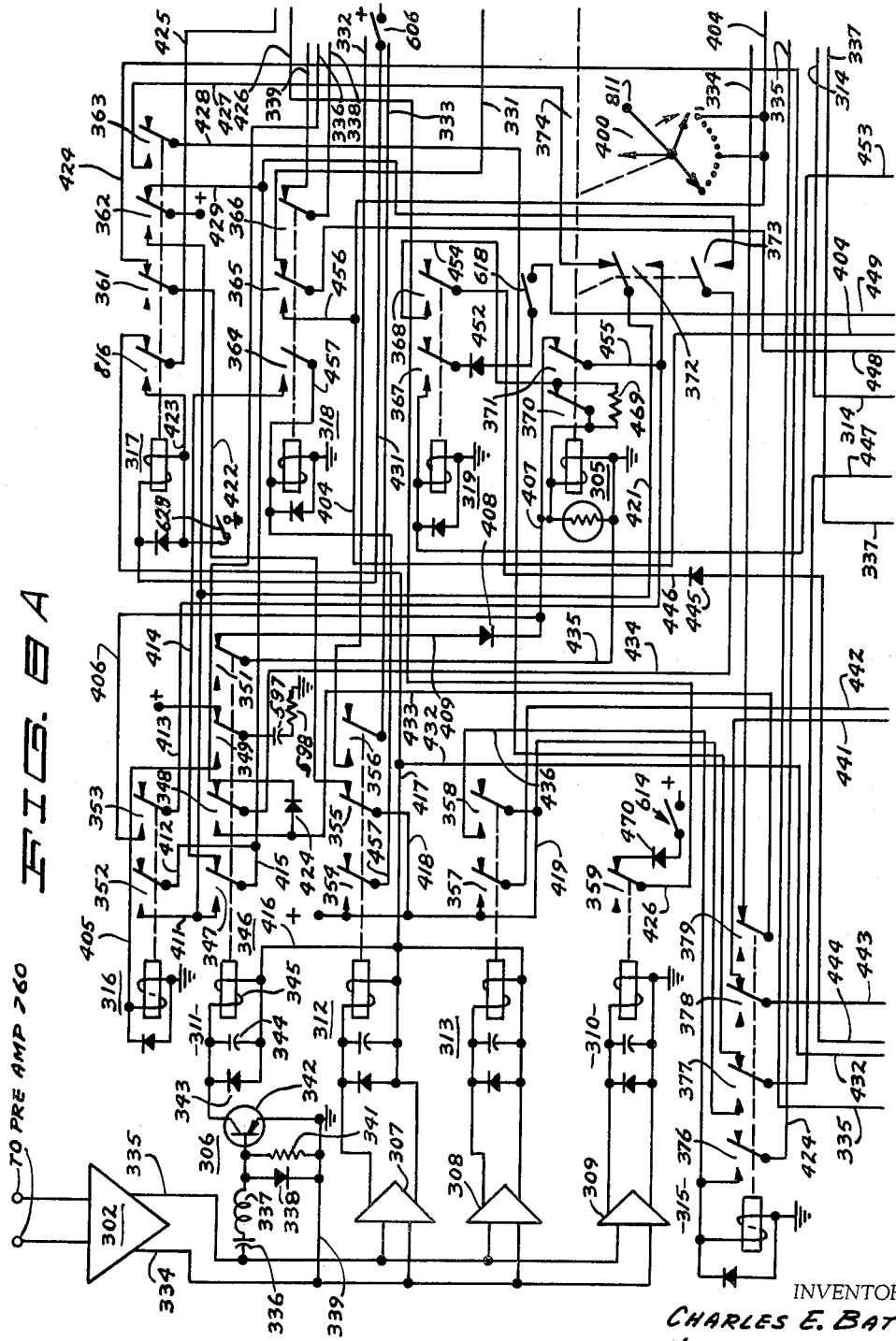

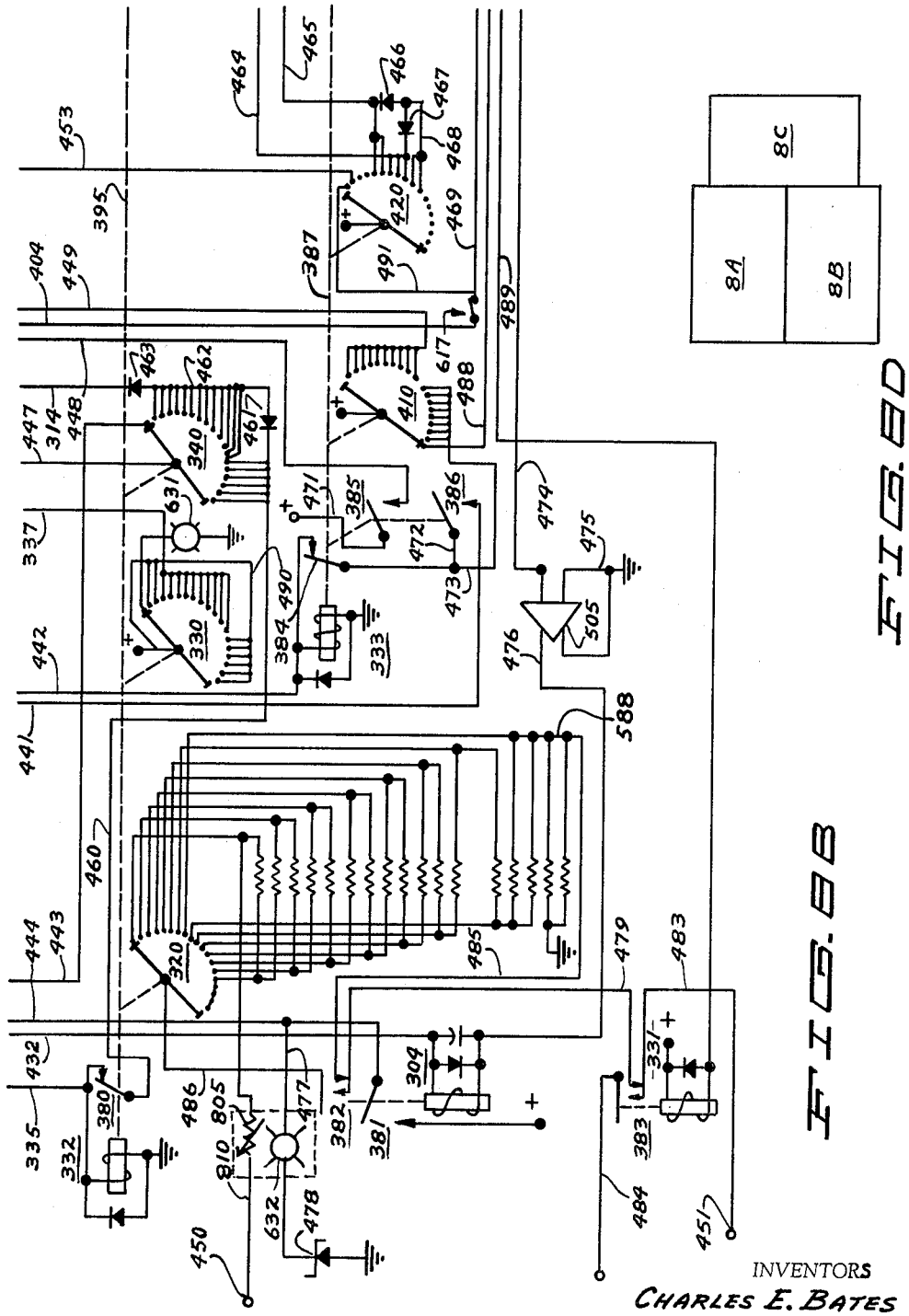

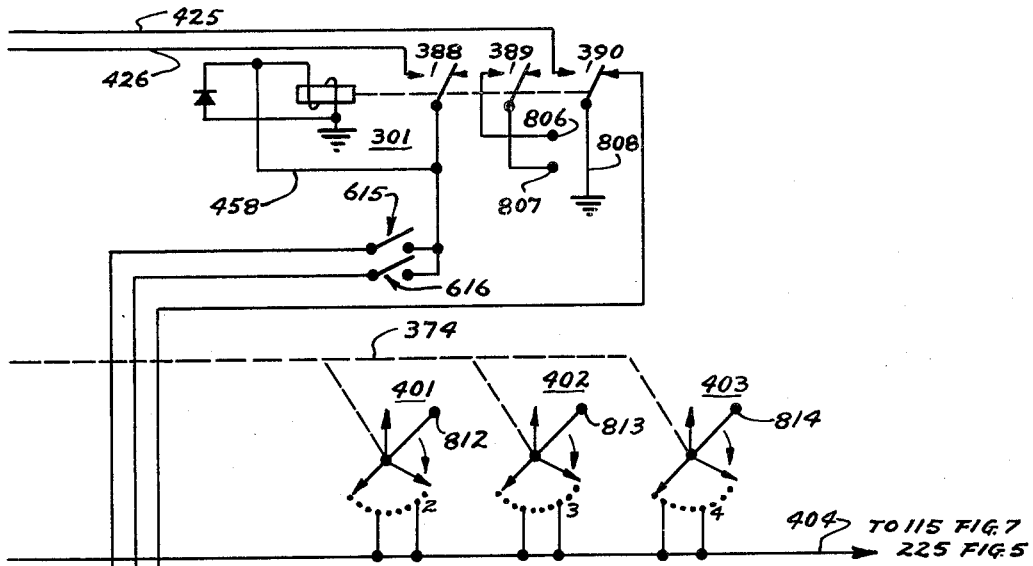
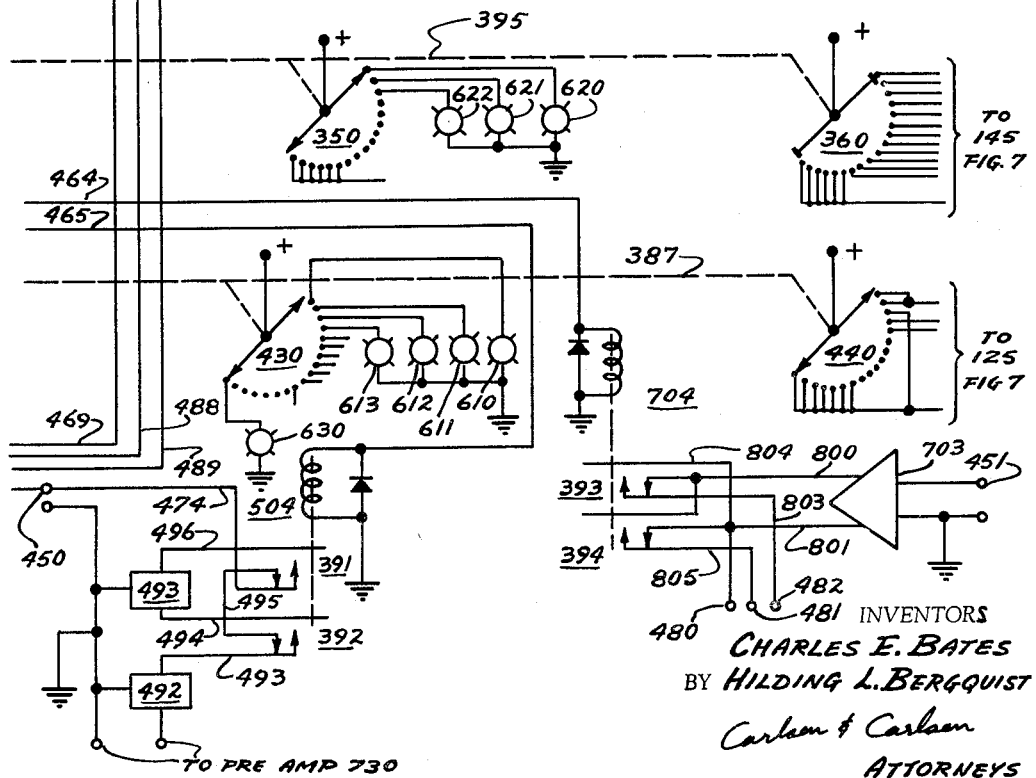
FIG. 8C

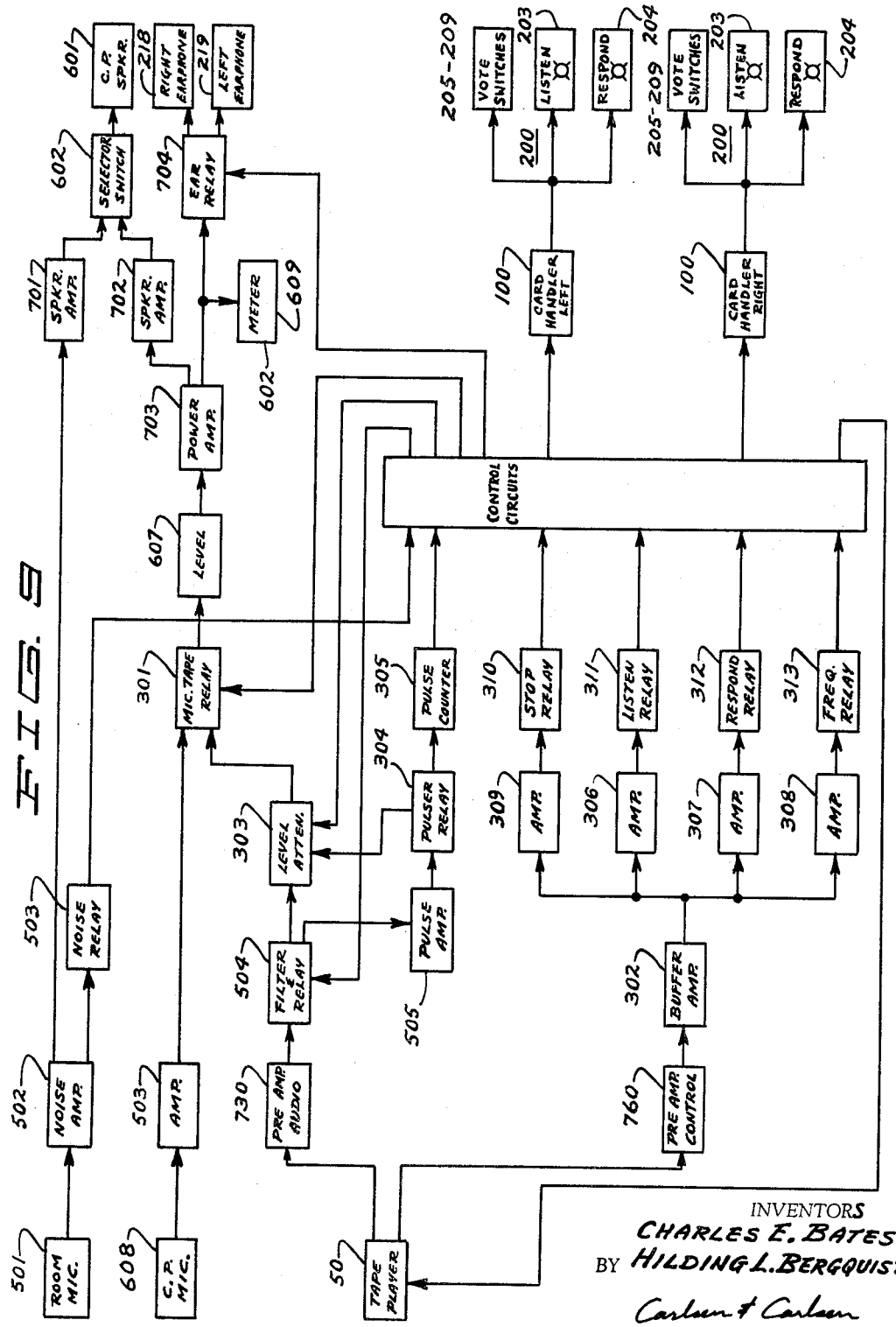

United States Patent Office 3,237,711
Patented Mar. 1, 1966

3,237,711
AUDIOMETRIC TESTING APPARATUS
Charles E. Bates, Blaine Village, and Hilding L. Bergquist, Minneapolis, Minn., assignors to The Electro Nuclear Systems Corporation, Minneapolis, Minn., a corporation of Minnesota
Filed Mar. 9, 1962, Ser. No. 178,744
24 Claims. (Cl. 181—.5)

This invention relates generally to the field of audiometers for testing the auditory sense organs and is more particularly directed to methods and apparatus for generating an accurate record of the status of the auditory sense organs of a plurality of test subjects.

The present state of the art with which this invention is concerned has created a necessity for obtaining records of the state of the auditory sense organs of individuals performing a substantial part of their ordinary working activities in environment of the type which contain noises likely to cause temporary or permanent damage to the individual's hearing capabilities. Not only are such records valuable for diagnosis and preventive measures for the good of the individual concerned, but for example, the field of workman's compensation, the need for convincing evidence of the hearing capability status of individuals at periodic intervals requires that suitable records be maintained by an employer or other organizations created to provide the service for the employer or various agencies of the government. Another specific area in which such records are necessary is that which is concerned with personnel working in proximity to modern jet propelled aircraft. In this area, extremely high transient and ambient noise conditions are prevalent and, in order to adequately protect individuals from damage it is necessary to maintain a continuing study of the personnel involved.

The enormous number of tests which must be given to satisfy these record requirements precludes the use of the highly trained audiologists in administering such tests. Prior art apparatus has provided some equipment which might be utilized in the hands of relatively inexperienced personnel to administer tests. However, the uniformity of such tests performed on the prior art equipment has left much to be desired in efforts of those concerned with the problem to establish a uniform standardized procedure which may be utilized in a number of different locations to provide uniform results which may be compared against a standard for the purposes of evaluation.

Further, prior art devices have been limited in the number of subjects which may be tested by one operator at any given time in addition to utilizing various methods which may be taken advantage of by a test subject to falsify the results of a test to the subject's advantage.

As will become apparent from a consideration of the attached specification and drawings, the present invention provides equipment and apparatus which may be operated by personnel with a minimum of training which does not require an intimate knowledge of the field of audiology, to simultaneously test a large group of individuals under test conditions which have, in the past, prevented the administration of any test. Further, methods and apparatus are incorporated to provide a procedure which tends to prevent and detects attempts of test subjects to influence a test record. Further, the influence of transient and/or ambient undesirable noise conditions which may affect the validity of a test or interfere with the ability of test subjects to hear and correctly respond to the audio stimuli utilized in the test, is reduced by appropriate means for repeating test procedures occurring during such noise or suspending the entire test until such noise is abated or removed. Further, a great deal of flexibility is provided in that the source of audiometric stimuli and control incorporated into the present apparatus of our invention is such as may be modified to perform substantially any desirable test program and which, of course, may be standardized to provide the same test for individuals tested at different locations on similar apparatus.

Further means and apparatus are provided for limiting the ability of a test subject to respond to any portion of the audio stimuli tests in such a manner as might impair the validity of the test. A test subject is given only one attempet to record a response to a particular portion of the test and, through means responsive to the particular test applied to the subject at that time, a recording means is operative to record only a correct response and to prevent the application of more than one response to the recorder indicating means. Such response by a test subject must be accomplished within a predetermined time after an audio stimulus is received so as to preclude further interference with the validity of the test by the test subject. In addition, a means responsive to individual pulse stimuli in a given test group is operable to transmit such stimuli to the auditory sensing organs of the test subject only when such stimuli signals are present and in such a manner as to provide a signal to the test subject which results in the elimination of false response due to characteristics of stimuli to be described below. By so characterizing the stimuli applied to the auditory sense organs of a test subject, an improved accuracy and reliability is obtained.

The auditory sense organs are likely to provide a false sensation of hearing for test stimuli occurring at the higher end of the frequency spectrum in that subharmonics of the signal, when applied to the auditory sense organs along with a high frequency test stimulus, provide a sensation of hearing while the test subject may not be capable of hearing the particular high frequency stimulus. A means for filtering such subharmonics, and other possible sources of lower frequency stimulus, from the test signals supplied to the subject is also incorporated in the present invention to increase the utility and validity of the test results.

It is therefore an object of the present invention to provide an audiometer which may be utilized to simultaneously perform an audiometric test upon a plurality of individuals and record the hearing response characteristics of each of the individuals.

Another object of the present invention is to provide audiometric testing apparatus which is operable from a standard source of stimulus and control signals to provide a high degree of uniformity between tests performed on different apparatus at different locations.

A still further object of the present invention is to provide audiometric testing apparatus which is operable in response to a plurality of signals contained on appropriate tracks of a record medium.

Another object of the present invention is to provide audiometric testing apparatus which may be operated in areas having high undesirable transient and ambient noise conditions.

Another object of the present invention is to provide response recording apparatus for an audiometric testing system in which the response of a test subject is recorded in such a manner as to substantially eliminate attempts by such test individuals to influence the test score.

Another object of the present invention is to provide audiometric testing apparatus in which a control means for effecting the application of audiometric test stimulus to a test subject is operable in response to a programmed recording medium.

A still further object of the present invention is to provide a method of applying a plurality of groups of random numbers of test stimuli of predetermined duration at a particular frequency to a test subject in descending and ascending levels of interlaced steps.

Another object of the present invention is to provide in audiometric testing apparatus, a means responsive to a test stimulus signal for applying said signal to the auditory sense organs of a test subject only when said signal is present and to characterize said test stimulus so as to prevent a false sensation of hearing by the test subject.

A still further object of the present invention is to provide apparatus for use in an audiometric testing apparatus which prevents the application of frequencies below the frequency of the test stimulus applied to the test subject.

These and other more detailed and specific objects will be disclosed in the course of the following specification, reference being had to the accompanying drawings, in which:

FIGS. 1A and 1B illustrate a complete system for testing the hearing capabilities of a plurality of subjects in which the principles of our invention are embodied.

FIG. 3 is a diagrammatic representation of one recorded program tape which will be used in connection with explaining the operation of the apparatus of our invention.

FIGS. 4, 5, 6, 7, 8A, 8B, and 8C are electrical schematic representations of one embodiment of our invention.

FIG. 8D is a block diagram of the assembled form of FIGS. 8A, B and C.

FIG. 9 is a functional block diagram of one embodiment of our invention.

Figure 1A:
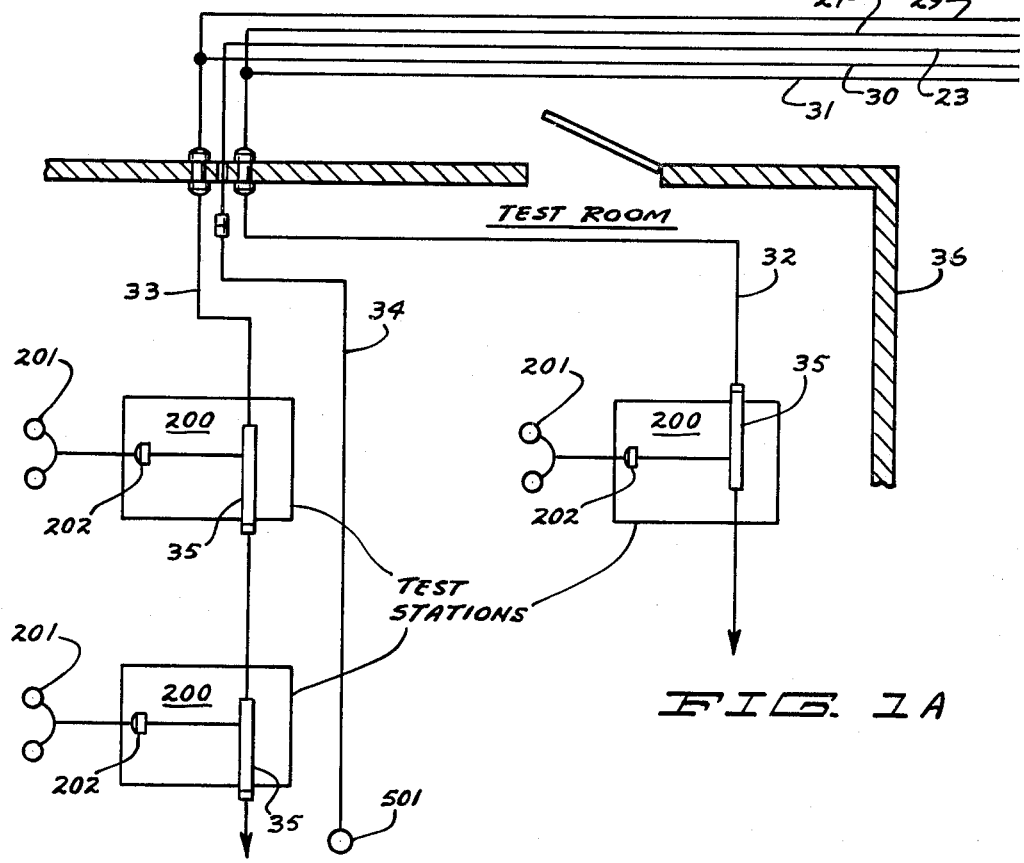

Referring now to FIGS. 1A and 1B, there is shown, on FIG. 1B, a block diagram of an operator's console, which for the purposes of description has been broken down into a plurality of separate chassis as might be found in apparatus constructed according to the principles of our invention. Appropriate cables are shown interconnecting various blocks to indicate generally the conductors through which various signals may flow. In FIG. 1A, there is shown a test room having a wall 36 constructed of suitable material and a door for access therein. Appropriate connectors are provided for a plurality of cables, 32, 33 and 34. Cable 34 is connected to an ambient noise microphone 501 for purposes to be explained below. Cables 32 and 33 are shown connected to individual test stations 200 through connectors 35 mounted upon cables 32 and 33. A pair of earphones 201 are connected to each of test stations 200 through a connecting means 202. Cable 33 is connected to further cables 29 and 30. Cable 34 is connected to cable 23. Cable 32 is connected to cable 21 and cable 31.

A power supply 10 is utilized to provide suitable power for use by various portions of the apparatus and includes, for instance, sources of alternating currents of suitable amplitudes and sources of direct current of suitable amplitudes, for instance, a direct current for operating of relay means and further direct current for operation of vacuum tube and transistor circuitry.

Control panel 100 contains appropriate indicators, switches, a microphone, a loudspeaker and a meter for use by the operator of the apparatus.

Audio chassis 700 contains appropriate amplifying and switching arrangements for controlling the amplitude and power of various audio signals and the application thereof to various other portions of the equipment.

A repeater chassis 500 includes appropriate circuitry for responding to noise in the test area and for providing control in interaction with various other portions of the apparatus in response to a noise signal above a predetermined level and during certain portions of a test.

Master control chassis 300 contains a plurality of means for controlling the operation of various portions of the apparatus and for effecting the audiometric test stimuli to be supplied to the test subjects.

Right and left card handlers 100 are utilized to record responses of test subjects upon a recording chart for each test subject.

A tape player 50 is utilized to provide a pair of outputs in response to the various signals recorded on the multiple track tape of FIG. 3.

An audio preamplifier 730 and a control preamplifier 760 are provided for amplifying the outputs of tape player 50.

Control panel 600 is connected to audio chassis 700 through cables 16, 17 and 18, to master control chassis 300 through cables 14 and 15. Audio chassis 700 is connected to repeater chassis 500 through cable 20, to master control chassis 300 through cable 19, to cable 33 in the test area through cable 29 and to cable 32 in the test area through cable 21. Power supply chassis 10 is connected to master control chassis 300 through cable 13. Repeater 500 is connected to master control chassis 300 through cable 22, to noise microphone 501 through cable 23 and cable 24, to master control chassis 300 through cable 25, to audio preamplifier 730 through cable 26 and cable 43 which is also connected to tape player 50 and control preamplifier 760 and to preamplifier 730 through cable 27. Tape player 50 is connected to preamplifier 760 through cable 42 and to preamplifier 730 through cable 41. Master control chassis 300 is connected to right and left card handlers 100 through cable 28 and to control preamplifier 760 through cable 24 and to a plug 11, adapted to be connected to a suitable source of alternating current, through cable 12. Right card handler 100 is connected to cable 33 in the test room through cable 30 and left card handler 100 is connected to cable 32 in the test room through cable 31. It is to be understood that additional card handlers and test stations may be added to the system as needed.

Figure 2:
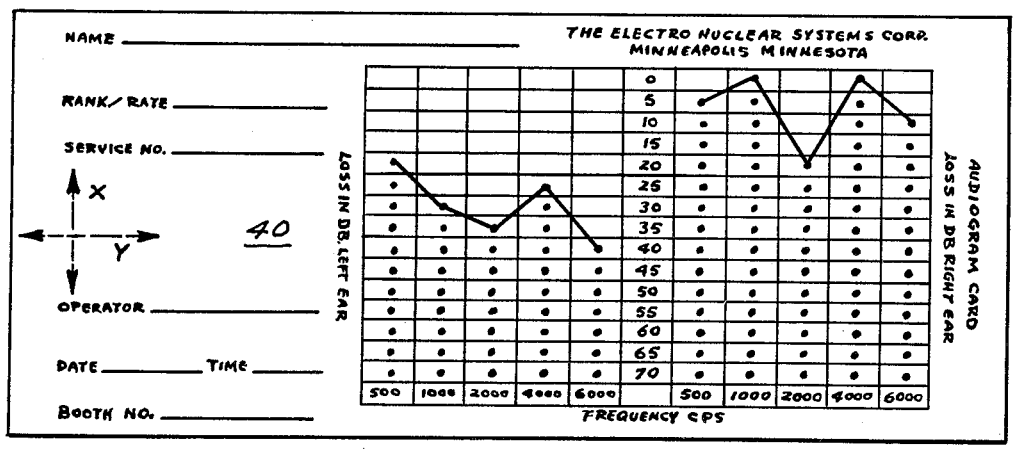
FIG. 2 is a representation of a record card which may be utilized in connection with the apparatus described herein.

FIG. 2 shows a card indicated generally by the reference character 40, which has a pair of dotted arrows indicating X and Y axes, the purposes of which will be explained below. Generally speaking, the card is movable (by apparatus not shown) along the Y axis and a printer mechanism is movable (by apparatus not shown) along the X axis. On the card itself, which may be known as an "audiogram" card, a plurality of dots, indicating correct responses by a particular test subject, are shown in columns corresponding to the various frequencies and levels of signals applied to the left and right ear of a test subject respectively. The curve (added after the test) which may be easily interpreted by the operator to indicate the hearing capability of the particular test subject. A plurality of cards 40 may be simultaneously carried by the card handlers and it is understood that there will be one card for each of the test subject stations 200 utilized with the apparatus at any particular time.

FIG. 3 illustrates various sections of a typical tape for use with tape player 50. The tape is provided with, in the present embodiment, a control track along the top and a signal track for audio stimuli pulses along the bottom. A plurality of signals of differing frequency are recorded on the control track in registration with groups of random numbers of audio stimuli pulses on the signal track. As indicated, the control pulses are provided for controlling functions labeled frequency, response, listen and stop and are indicated by the symbols shown in the drawings. These control signals are of different frequencies for utilization by various portions of the apparatus responsive to particular frequencies as will be described below. As an example, only three stimulus groups are indicated by the reference characters and arrows 91, 92 and 93. Each of the stimulus test groups includes a listen pulse of 500 millisecond duration at the beginning and a 100 millisecond response pulse at the end. The distance, or period between the listen and response pulses is utilized for, in the present embodiment, four or less stimuli pulses, each of constant amplitude and of 100 millisecond duration. The individual test stimulus groups are separated by a two second interval. For each of the test frequencies for each ear, there are fifteen or more test stimulus groups. Each time a group frequency is changed, a frequency pulse is placed on the control track before a listen pulse and is of 100 millisecond duration. The portion of the tape indicated by the reference character 90 comprises a pre-test group and is adapted to ready the apparatus for the performance of an actual test. It includes a stop pulse on the control track which is followed by a 500 cycle signal and a 6,000 cycle signal, each of thirty second duration, on the signal track which is in turn followed by a 100 millisecond frequency pulse and another stop pulse on the control track. During the pre-test group, the operator may calibrate the apparatus. After the apparatus has responded to the pre-test signal, the operator may initiate an actual test. It is anticipated that suitable instructions for the individual test subjects in taking the test may also be recorded on the signal track of the tape. It may be noted that test stimulus group 92 includes a listen and response pulse on the control track as in the other test groups but does not include any test stimuli on the signal track. This is to provide a test stimulus group to serve as control group to enhance the validity of the test and is always followed by a "real" stimulus group at the same level.

In one embodiment of our invention, a tape containing audio signal track frequencies of 500, 1,000, 2,000, 4,000 and 6,000 cycles per second was prepared in which eighteen groups of audio stimulus signals were provided for each of the five different test frequencies and each of the five different test frequencies were duplicated so as to provide a complete range for the right and left ears of a test subject. As will become apparent below in regard to the explanation of the electrical schematic diagrams, internal circuitry on the illustrated embodiment serves to reset the apparatus for another test after the five test frequencies have been applied to each ear of a test subject. A tape prepared according to any predetermined set of test frequencies and having suitable test characteristics may be pre-recorded and readily duplicated to provide a suitable uniform standard of operation regardless of the locations of the audiometric apparatus and the skill of an operator as long as minimum training has been provided.

Referring now to FIG. 9, there is shown a functional block diagram in which like reference characters have been applied to like elements and reference characters from series founded in the block diagrams of FIGS. 1A and 1B have been applied so as to indicate correspondence and relative locations of the elements.

A tape player 50 is shown having two outputs connected to an audio preamplifier 730 and a control preamplifier 760 respectively. The preamplifiers may be of good quality standard construction adapted to pass the required frequency spectrum found on the audio signal track and control signal track of the tape. Tape player 50 is a commercially available tape player sold under the Viking trademark and which may be identified as Model No. 65 and is modified to the extent indicated in the electrical schematic of FIG. 4. The output of control preamplifier 760 is connected to the input of a buffer amplifier 302 which may be one of a number of commercially available amplifiers of suitable band pass characteristic and serves only to amplify and provide isolation and impedance matching between preamplifier 760 and the following stages of amplification. The output of buffer amplifier 302 is applied in parallel to amplifiers 306, 307, 308 and 309. Each of the last named amplifiers is adapted to pass only one of the four control signal frequencies corresponding to the functions enumerated on FIG. 3, respond, frequency, listen, and stop respectively. The output of amplifier 309 is connected to stop relay 310. The output of amplifier 306 is connected to listen relay 311. The output of amplifier 307 is connected to respond relay 312. The output of amplifier 308 is connected to frequency relay 313. Each of the last named relays is connected in circuit with the large block in the center of the drawing labeled "control circuits." It may be noted that there is a connection from the control circuit block to tape player 50 for purposes to be explained below. The control circuit block is also connected to left card handler 100 and to right card handler 100, each of which is shown connected to a subject test station 200 comprised of response, or vote, switches 205–209, a listen indicator 203 and a respond indicator 204. While it may be apparent that there may be a plurality of subject test stations connected to each of the card handlers, only one has been shown to avoid unnecessary confusing duplication of elements. The output of audio preamplifier 730 is connected to filter relay 504 which is in turn connected to both level attenuator 303 and to pulse amplifier 505. The relay associated with filter relay 504 is connected to the block labeled conrol circuits. The output of pulse amplifier 505, which may be any of a number of commercially available amplifying devices possessed of suitable response time characteristics for amplifying the audio pulse stimuli on the audio signal track of the tape, is connected to pulse relay 304 which is in turn connected to level attenuator 303 and pulse counter 305. Pulse counter 305 is also connected to the block labeled control circuits. Room microphone 501 is connected to noise amplifier 502, which is an amplifier of suitable response characteristic and which contain appropriate adjustments for providing a threshold of operation on the output applied to noise relay 503. Another output from noise amplifier 502, which does not provide a threshold of operation, is connected to speaker amplifier 701, which may be a commercially available amplifying element of suitable power output, and is in turn connected to selector switch 602 which is operable to connect one or the other of speaker amplifier 701 and 702 to control panel speaker 601. Control panel microphone 608 is connected to amplifier 501 which again may be a suitable voltage amplifying device of one of many types of commercially available, the output of which is connected to microphone-tape relay 301. It may be noted that microphone-tape relay is provided with an input from level attenuator 303 and from the block labeled control circuits. The output of microphone-tape relay 301 is connected to a level control 607 which may be a potentiometer of sufficient power handling capacity, which is in turn connected to the input of a power amplifier 703. Power amplifier 703 may be one of a number of commercially available amplifiers of suitable power output and frequency response characteristics. The output of power amplifier 703 is connected to speaker amplifier 702 and to ear relay 704 which is in turn connected to right earphone 218 and left earphone 219 and to other earphones (not shown). Ear relay 704 is also connected to the block labeled control circuits.

While the operation of part of FIG. 9 will be considered in connection with the explanation of operation of the electrical schematic drawings to be described below, certain functions have been omitted from the electrical schematics, such as the monitoring functions for the test room which is accomplished through room microphone 501, noise amplifier 502, speaker amplifier 701, selector switch 602 and control panel speaker 601. Likewise, monitoring of a test may be accomplished by the connection from power amplifier 703 to speaker amplifier 702 through selector switch 602 to control panel speaker 601. Communication to the test subjects may be accomplished from control panel microphone 508 to amplifier 503 through microphone-tape relay 301, level control 607, power amplifier 703, ear relay 704 to left earphone 219. It should also be noted that meter 609 is provided at the output of power amplifier 703 for the convenience of the operator in calibrating the apparatus before initiating a test.

Referring now to FIG. 4, the modifications provided to a standard, commercially available tape player 50 are shown in electrical schematic form. A pair of input terminals 51 and 53 are provided for connection to a suitable source of alternating current energy (not shown) which is provided as an integral part of the audiometric testing apparatus. A motor 54 is connected to terminals 51 through conductor 52 and to a common ground through conductor 55 and is adapted to run continuously. A resistor 56, an asymmetrical current conducting device 57 and capacitor 58 are also connected to conductor 52 to provide a source of direct current for purposes to be explained below.

Except where otherwise noted, all of the relay contact assemblies are shown in normally de-energized position and are comprised of an "in" contact, an "out" contact and a movable contact. In some cases, not all of the contacts are utilized, however, this should present no difficulty in understanding the operation of our invention. Normal relay terminology is followed so that the "in" contact would be connected to the movable contact when a relay is energized and the "out" contact would be connected to the movable contact when the relay is de-energized.

Conductor 59 is connected to the output of the source of direct current and to the movable contact on relay contact assembly 89. The stationary contact on relay contact assembly 89 is connected to relay winding 66 and to switch means 63, through conductor 64. Relay winding 66 is drivingly connected to contacts 67, 68 and 73, shown in the normal de-energized position, and which are actuated by driving means 91 to the opposite state, or position, upon an energization of relay winding 66. Contact assembly 89 is also connected to a rewind clutch solenoid 65 which is in turn connected to ground through relay contact 68. Conductor 64 is connected to the "in" contact on switch means 63, the movable contact of which is connected to ground through capacitor 90. Switch means 63 is connected to switch means 61 through driving means 62. Conductor 60, also connected to the output of the source of direct current potential is connected to the movable contact of switch means 61. The left, or "in" contact on switch means 61 is connected to relay winding 83 through conductor 71, an asymmetrical current conducting device 72 and contact assembly 73. Relay winding 83 may be connected to ground through a forward tension switch means 84 or through contact assembly 82, contact assembly 389 and contact assembly 562 connected to terminals 85–86 and 87–88 respectively. Conductor 71 is connected to the right, or "out" contact on switch means 63 through conductor 74, resitor 75, asymmetrical current conducting device 77 and conductor 76. Forward clutch solenoid 79 is connected to intermediate conductor 76 and to contact assembly 81 through conductor 80. Capstan solenoid 78 is connected to intermediate conductor 74 and contact assembly 81. Contact assemblies 81, 82 and 89 are drivingly connected to relay winding 83 through driving means 70 and are adapted to be actuated upon energization thereof.

Referring now to FIG. 5, there is shown an electrical schematic diagram of a subject test station 200. Test station 200 includes a connector 35 which is adapted to be connected to cables 33 and 34 in FIG. 1A. A jack 202 is provided for connection to terminals 480, 481 and 482 on the lower right hand corner of FIG. 8C and is adapted to receive a plug connected to earphone 201. Headset 201 includes a right ear transducer 218 connected to conductor 223 through level adjustment potentiometer 214, having a wiper 215 associated therewith, and to conductor 221 through terminal 220. Left ear transducer 219 is connected to conductor 222 through level adjustment potentiometer 216, having wiper 217 associated therewith, and to conductor 221 through terminal 20. A listen indicator light 204 is connected between ground conductor 226 and conductor 331 on FIG. 8A through conductor 224. A zener diode (not shown) may be connected in parallel with light 204. Respond indicator light 203 is connected to ground conductor 226 and to conductor 404 on FIG. 8C through resistor 234 and conductor 225. A plurality of respond switch means, 205, 206, 207, 208 and 209, corresponding to test stimulus groups, having 4, 3, 2, 1, and 0 audio pulse stimuli respectively are connected as indicated below. Switch 209 is adapted to complete a circuit from ground conductor 226 through conductor 235 to output conductor 210 which is connected through plug means 213 to a plurality of pairs of contacts 212 to respective lock-out relays 110 (FIG. 7), on the card handler. It should be noted that there are corresponding lock-out and printer solenoid devices associated with each position in a card holder for individual record cards as, for example, record card 40 in FIG. 2. Each of the other switches, 205, 206, 207, and 208 may complete a connection from wipers 811, 812, 813 and 814 on pulse counter relay contact assemblies 400, 401, 402 and 403 (FIGS. 8A and 8C) respectively through conductors 230, 229, 228 and 277. A second pair of contacts on switch means 205, 206, 207 and 208 serve to connect the respective last named conductors to a conductor 211 which may in turn be connected to selected printer solenoids 120 (FIG. 7) through connector 213.

Referring now to FIG. 6, a noise microphone 501 is shown connected to the input of amplifying means 502 through conductors 510 and 511 which may form a part of cable 34 connected to microphone 501 in the test room shown in FIG. 1A. The output of amplifier 502 is connected to relay 503, having a capacitor 514 in parallel therewith, through conductors 513 and 512. Amplifier 502 includes conventional voltage amplification circuitry and a means for establishing a threshold of operation on the output terminals connected to noise relay 503 as to prevent energization thereof below a predetermined magnitude of signal output from microphone 501. Relay contact assembly 515 has an "in" contact connected to conductor 337 (FIG. 8A) and a movable contact connected to conductor 339 (FIG. 8A) through conductor 508 and conductor 509. A repeat relay 520, having asymmetrical current conducting device 523 in parallel therewith, is connected between ground and conductor 338 (FIG. 8A) through conductor 507. A plurality of contact assemblies, 524, 525, and 526 are adapted for actuation by relay 520. The "in" contact on assembly 524 is connected to relay 520 in a manner so as to form a holding circuit therefor. The movable contact on assembly 524 is connected to conductor 339 (FIG. 8A) through conductor 509. The "in" contact on assembly 525 is connected to a source of positive potential through conductor 527 while the movable contact thereof is connected to conductor 332 (FIG. 8A) through conductor 521. The "in" contact on contact assembly 526 is connected to a memory relay 540 through conductor 542 and the movable contact on assembly 526 is connected to a suitable source of direct current potential.

Figure 7:
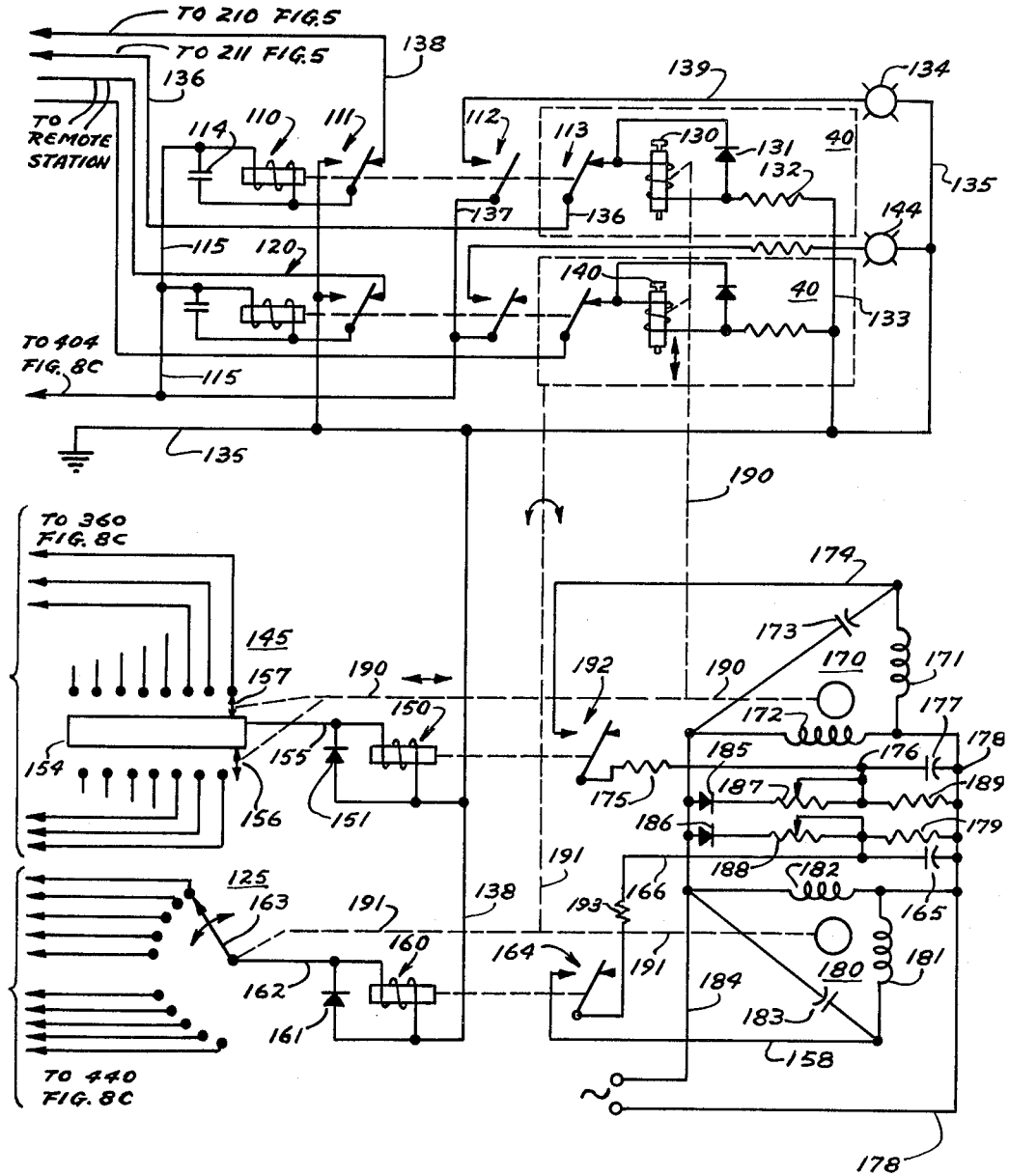

Relay 540, having capacitor 541 is in parallel therewith, is connected to a "repeat" indicator light 604 on control panel 600, FIG. 1B. The "in" contact on contact assembly 544 is connected to relay 540 and the movable contact is connected to conductor 336 (FIG. 8A) through conductor 547. The "out" contact on contact assembly 545 is connected to conductor 335 (FIG. 8A) through conductor 549 and the movable contact thereof is connected to conductor 334 (FIG. 8A) through conductor 548. A suspend relay 560, having asymmetrical current conducting device 564 connected in parallel therewith, is connected to conductor 333 (FIG. 8A) through conductor 563. The "in" contact on contact assembly 561 is connected to relay 560 and the movable contact thereof is connected to conductor 332 (FIG. 8A) through conductor 522 and 521. The "out" contact on contact assembly 562 is connected to terminal 87 (FIG. 4) through conductor 567 and the movable contact thereof is connected to terminal 88 (FIG. 4) through conductor 556. An excess repeat relay, having a capacitor 572 in parallel therewith, is connected between ground and the movable contact assembly 574 through conductor 573. The "in" contact on contact assembly 574 is connected to excess repeat switch means 605 on control panel 600 (FIG. 1B) to a source of D.C. potential and the "out" contact on assembly 574 is connected to conductor 314 (FIG. 8A) through conductor 571. The "in" contact on contact assembly 575 is connected to an excess repeat indicator light 603 on control panel 600 (FIG. 1B) and the movable contact thereof is connected to switch 605 and the source of D.C. potential FIG. 7 is an electrical schematic representation of right and left card handlers 100. Each of the two test recording positions shown contains a printer solenoid and a lock-out relay with an indicator light to indicate energization of the latter. Printer solenoids 130 and 140 are carried by suitable movable mounting means to be positioned along the "level" or X axis of the record cards 40 in correspondence with the level of the signal being supplied to the test subjects. As will be explained below, the assembly is positioned through operation of control circuits for motor 170. The record cards 40 are positioned in the Y or "frequency" axis, with respect to the printer solenoids, through suitable means (not shown) adapted to engage the cards in a manner similar to that utilized in a typewriter roller which is in turn positioned, or driven, by driving means 191 connected to a motor 180. Motors 170 and 180 are connected to driving means 190 and 191 respectively which in turn are connected to a printer solenoid carrying assembly and the card moving assembly respectively and to linear follower switch 145 and rotary follower switch 125. Motor 170 includes a pair of windings and a phase shifting capacitor 173 connected with winding 172 energized from a suitable source of alternating current energy (not shown) through conductors 178 and 184. The series connected winding 171 and capacitor 173 are connected in parallel across winding 172. In like manner, motor 180 includes a pair of windings 181 and 182 and a capacitor 183 connected with winding 182 across conductors 178 and 184 and the series combination of winding 181 and capacitor 183 connected in parallel with winding 182. A pair of sources of direct current energy are connected across conductors 178 and 184, the first of which includes asymmetrical current conducting device 185, potentiometer winding 187 having a wiper associated therewith and capacitor 177 having resistor 189 connected in parallel therewith. A second source of D.C. includes asymmetrical current conducting device 186, potentiometer winding 188 having a wiper associated therewith and resistor 179 having capacitor 165 is parallel therewith. A contact assembly 192 adapted to be actuated by relay 150 has its movable contact connected to the source of D.C. potential through resistor 175 and its "in" contact is connected to the connection between capacitor 173 and winding 171 on motor 170 through conductor 174. Contact assembly 164 adapted to be energized by relay 160 is connected with its movable contact connected to the source of D.C. potential through resistor 193, conductor 166 and the "in" contact to the junction between motor winding 181 and capacitor 183 through conductor 158. Level motor braking relay 150 is connected to a conductive member 154 on switch means 145 and to ground conductor 135 through conductor 138. An asymmetrical current conducting device 151 is connected in parallel therewith. A pair of sliding contacts 157 and 156, drivingly connected to driving means 190, are adapted to interconnect the conductive member 154 to stationary contacts linearly of member 154. Each of the stationary contacts are connected to corresponding stationary contacts on contact assembly 360 (FIG. 8C) associated with level stepping relay 333. In similar manner, frequency motor braking relay 160, having asymmetrical current conducting device 161 in parallel therewith, is connected to wiper 163 on switch assembly 125 through conductor 162 and to ground conductor 135 through conductor 138. The stationary contacts on switch assembly 125 are connected to corresponding stationary contacts on contact assembly 440 (FIG. 8C).

Lock-out relay 110, having capacitor 114 in parallel therewith, is connected to conductor 404 in FIG. 8C through conductor 115 and to conductor 210 on FIG. 5 through the movable contact on contact assembly 111, the corresponding "out" contact and conductor 138. The "in" contact on contact assembly 111 is connected to ground conductor 135.

Printer solenoid 130, having asymmetrical current conducting device 131 in parallel therewith, is connected to ground conductor 135 through conductor 133 and resistor 132 and to conductor 211 on FIG. 5 through conductor 136, the movable contact on contact assembly 113 and the "out" contact on assembly 113. The "in" contact on contact assembly 112 is connected to ground conductor 135 through conductor 139 and indicator lamp 134, the corresponding movable contact is connected to conductor 404 (FIG. 8C) through conductor 137 and conductor 115.

Contact assembly 347 on listen relay 311 has an "in" contact connected to conductor 411, a movable contact connected to conductor 415 and an "out" contact connected to conductor 414. Contact assembly 348 has an "in" contact connected to conductor 433, a movable contact connected to conductor 434 and an "out" contact connected to conductor 336 and to the "in" contact through asymmetrical current conducting device 424 poled in the direction shown; contact assembly 349 is provided with an "in" contact connected to advance relay 316, having an asymmetrical current conducting device connected in parallel therewith, through conductor 405, the movable contact connected to ground through capacitor 425 and resistor 426 and an "out" contact connected to a source of D.C. (not shown); and contact assembly 351 having a movable contact connected to ground through conductor 435 and an "out" contact connected to conductors 406 and 407 through conductor 409 and asymmetrical current conducting device 408. Respond relay 312 includes: contact assembly 354 having an "in" contact connected to a suitable source of direct current and a movable contact connected to conductor 457; contact assembly 355 has a movable contact connected to a source of direct current through conductor 418 and an "out" contact connected to conductor 422; and contact assembly 356 is provided with an "in" contact connected to conductor 332 and a movable contact connected to conductor 333.

Frequency relay 313 includes: contact assembly 357 having an "in" contact connected to a source of D.C. and a movable contact connected to conductor 442; and contact assembly 358 having an "in" contact connected to conductor 436 and a movable contact connected to a source of direct current.

FIGS. 8A, B and C, when assembled in the manner indicated in FIG. 8D, comprise a complete electrical schematic diagram. All of the relays are shown in either their de-energized or, in the case of the stepping relays, their "home" position.

Starting at the upper left-hand corner of FIG. 8A, buffer amplifier 302 is provided with a pair of terminals adapted for connection to preamplifier, control, 760. The output of amplifier 302 is connected to a pair of conductors 334 and 335 connected in parallel to listen amplifier 306, respond amplifier 307, frequency amplifier 308 and stop amplifier 309. Each of the last named amplifiers is comprised of components adapted to pass only a particular frequency found on the control track of the tape, as in FIG. 3. The frequencies may be of suitable value selected so as not to interfere with the operation of the apparatus with regard to the audio test stimuli pulses or with each other. A representative amplifier circuit is indicated for the listen amplifier 306 and includes a transistor having a base electrode connected to conductor 335 through inductor 337 and capacitor 336 and an emitter electrode connected to ground and to conductor 334 through conductor 339. Resistor 341 and an asymmetrical current conducting device 338 are connected across the emitter and base electrodes in the manner shown. The collector electrode is connected to listen relay 311 having capacitor 344 and asymmetrical current conducting device 343 in parallel therewith. Relay 311 is also connected in common with respond relay 312 and frequency relay 313 through conductor 416 connected to conductor 417 which is in turn connected to the "out" contact on contact assembly 816 on reset relay 317. In like manner respond relay 312 is connected to the output of amplifier 307, frequency relay 313 is connected to amplifier 308 and stop relay 310 is connected to amplifier 309.

Stop relay 310 includes contact assembly 359 having a movable contact connected to conductor 426 and an "out" contact connected to a source of D.C. through "on" switch means 614 and asymmetrical current conducting device 470. Advance relay 316 includes: contact assembly 352 having an "in" contact connected to conductor 411, a movable contact connected to conductor 412 in turn connected to conductor 415; and contact assembly 353 having an "in" contact connected to conductor 406 and a movable contact connected to conductor 413.

A reset relay 317, having an asymmetrical current conducting device connected in parallel therewith is connected to ground through switching means 629 and to conductor 431. Reset relay 317 includes: contact assembly 816 having an "in" contact connected to conductor 423, a movable contact connected to conductor 425 and an "out" contact connected to conductor 417; contact assembly 361 having a movable contact connected to conductor 422 and an "out" contact connected to conductor 424; contact assembly 362 having an "in" contact connected to conductor 411, a movable contact connected to a suitable source of D.C., and an "out" contact connected to conductor 429 connected to conductor 415; and contact assembly 363 having an "in" contact connected to conductor 427 and a movable contact connected to conductor 428.

Listen-respond relay 318, having an asymmetrical current conducting device connected in parallel therewith is connected between ground and conductor 457 and includes: contact assembly 364 having an "in" contact connected to conductor 414 and a movable contact connected to conductor 457; contact assembly 365 having an "in" contact connected to conductor 404 through conductor 456, a movable contact connected to conductor 448 and an "out" contact connected to conductor 331; and contact assembly 366 having a movable contact connected to conductor 338 and an "out" contact connected to conductor 339.

Pulse enable relay 319, having an asymmetrical current conducting device connected in parallel therewith, is connected between ground and conductor 453 and includes: contact assembly 367 having an "in" contact connected to conductor 453 and a movable contact connected to conductor 449 through asymmetrical current conducting device 452 and test switch means 618; and contact assembly 368 having an "in" contact connected to conductor 454 and a movable contact connected to conductor 446.

Tape play relay 301 having an asymmetrical current conducting device in parallel therewith, is connected between ground and test switch means 615 and pre-test switch means 616 through conductor 458 and includes: contact assembly 388 having an "in" contact connected to conductor 426 and a movable contact connected to switch means 615 and 616; contact assembly 389 having an "in" contact connected to terminal 806 and a movable contact connected to terminal 807 and contact assembly 390 having an "in" contact connected to conductor 425, a movable contact connected to ground through conductor 808 and an "out" contact connected to conductor 489.

Attenuation homing relay 315 (lower left corner of FIG. 8A), having an asymmetrical current conductor device connected in parallel therewith is connected between ground and conductor 436 and includes: contact assembly 376 having an "in" contact connected to conductor 436 and a movable contact connected to conductor 424; contact assembly 377 having an "in" contact connected to conductor 419; a movable contact connected to conductor 447 and an "out" contact connected to conductor 428; contact assembly 378 having a movable contact connected to conductor 443 and an "out" contact connected to conductor 441; and contact assembly 379 having a movable contact connected to conductor 433 and an "out" contact connected to conductor 334.

Microphone-tape relay, have an asymmetrical current conducting device connected in parallel therewith, is connected between a source of D.C. and conductor 489 and includes contact assembly 383 having an "out" contact connected to conductor 479, a movable contact connected to conductor 484 and make before break "in" contact connected to terminal 451 through conductor 483.

Pulser relay 304, having a capacitor and an asymmetrical current conducting device connected in parallel therewith, is connected to the output of pulser amplifier 505 through conductor 476 and to conductor 434 and includes: contact assembly 381 having an "in" contact connected to a source of D.C. and a movable contact connected to conductor 444 and to ground through conductor 477, a source of radiant energy 632 and zener diode 478; and contact assembly 382 having a make before break "out" contact connected to terminal 588 on the potentiometer stepping assembly 320, a movable contact connected to the wiper on contact assembly 320 through conductor 486 and an "in" contact connected to conductor 479.

Ear relay 704, having an asymmetrical current conducting device connected in parallel therewith, is connected to selected contacts on contact assembly 420 on frequency stepper relay 333 through conductor 464 and to ground and includes: contact assembly 393 having a movable contact connected to terminal 480 through conductor 804, a make before break "in" contact connected to output terminal 482 through conductor 803 and an "out" contact connected to the movable contact on contact assembly 394 and to the output of power amplifier 703 through conductor 800; and a contact assembly 394 having a movable contact connected to the "out" contact on contact assembly 393, a make before break "in" contact connected to terminal 481 through conductor 805 and an "out" contact connected to terminal 480 and to the output of the power amplifier 703 through conductor 801. The input of power amplifier 703 is connected to terminal 451 associated with microphone-tape relay 331 and to the common system ground.

Filter relay 504, having an asymmetrical current conducting device in parallel therewith, is connected between ground and selected terminals on contact assembly 420 on frequency stepper relay 333 through conductor 465 and includes: contact assembly 391 and having a movable contact connected to the output of a filter assembly 493 through conductor 496, a make before break "in" contact connected to output terminal 450 through conductor 474 and "out" contact connected to the "out" contact on contact assembly 392 through conductor 495; and contact assembly 392 having a movable contact connected to filter 493 through conductor 494, a make before break "in" contact connected to filter device 492 through conductor 493 and an "out" contact connected as above described. The input to filters 492 and 493 is provided with a pair of terminals adapted for connection to the output of preamplifier, audio, 730 and it will be noted that one of the connections is connected to a common system ground. Pulser amplifier 505 is connected to the output of the filter relay apparatus through conductor 474 and to ground through conductor 475. The output of amplifier 505 is connected to energize pulser relay 304 through conductor 476.

Pulse counter stepping relay 305, having a varistor in parallel therewith is connected to ground and to conductor 407 and includes: contact assembly 370 having a movable contact connected to relay 305 and to conductor 454 through a circuit including resistor 469 and the "out" contact associated therewith: contact assembly 371 having a movable contact connected to conductor 413 through conductor 455 and an "out" contact connected to conductor 407; an "off normal" contact assembly 372 having an "out" contact connected to conductor 427, a movable contact connected to conductor 421 and an "in" contact connected to conductor 413: a second "off normal" contact assembly 373 includes: a movable contact connected to conductor 434 and an "in" contact connected to conductor 415: and four stepping switch contact assemblies 400, 401, 402 and 403, each having an output terminal 811, 812, 813 and 814 respectively connected to the movable wipers thereof and having selected pairs of stationary contacts connected in common to conductor 404 which is in turn connected to conductor 114 on FIG. 7 and conductor 225 on FIG. 5. It may be noted that one of each of the four stepping switch contact assemblies corresponds to the number of pulse stimuli (one to four) in a stimulus group. A suitable driving mechanism 374 is connected to the output of pulse counter relay 305 and to each of the contact assemblies operable in response thereto.

Level stepper relay 332, having an asymmetrical current conducing device in parallel therewith, is connected between ground and conductor 335 connected to conductor 549 (FIG. 6). The following contact assemblies are drivingly connected through driving means 395 to level stepper relay 332: contact assembly 380 having a movable contact connected to conductor 460 and an "out" contact connected to relay 332: attenuation stepping contact assembly 320 having a wiper connected to conductor 486 and a plurality of interlaced resistors connected so as to provide successive levels of output in accordance with an interlaced pattern in which the level of the signal supplied to the test subject is varied in equal incremental steps from 70 db to 0 db and from 5 db to 65 db or from a maximum to a minimum and back to a maximum: a contact assembly 330 including a wiper connected to a suitable source of direct current and to selected stationary contacts, stationary contact No. 1 is connected to indicator 631 on the control panel 600 so as to provide an indication of the status of the level stepper relay as being in a ready condition for a test, contacts 4, 5, 6, 7, 8, 9, 10, 11, 12 and 13 are connected to conductor 337; connected to conductor 507 (FIG. 6): contact assembly 340 having a wiper connected to conductor 447 and stationary contacts 2 through 14 (not all of which are shown) connected to conductor 462 and thence to conductor 314 (connected to conductor 571 (FIG. 6)) through asymmetrical current conducting device 463 and to conductor 460 through asymmetrical current conducting device 461. Stationary contact number 1 is connected to the movable contact on contact assembly 378 on relay 315. The remainder of the stationary contacts, corresponding to those not used in the illustrative embodiment of the equipment are directly connected to conductor 460: contact assembly 350 includes a wiper connected to a suitable source of direct current potential and a plurality of indicator lights, 620, 621 and 622 on the control panel for indicating to the operator the level of the signal being supplied to the test subject. There is an indicator light for each of the levels utilized and, in the case of the present embodiment, 15 lights would be present corresponding to the 15 levels of audio test stimulus applied to the test subject: and contact assembly 360 having a wiper connected to a source of D.C. and corresponding stationary contacts connected to switch assembly 145 on FIG. 7 for positioning the printer solenoid mounting for level or X axis of the card handling apparatus.

Frequently stepper relay 333 having an asymmetrical current conducting device connected in parallel therewith, is connected between ground and conductor 442. The following contacts assemblies are drivingly connected to the output of relay 333 through driving means 387: contact assembly 384 having a movable contact connected to conductor 473 and an "out" contact connected to relay 333: "off normal" contact assembly 385 having a movable contact connected to a source of D.C. through conductor 471 and an "in" contact connected to conductor 448; an "off normal" contact assembly 386 having a' movable contact connected to conductor 473 and an "in" contact connected to conductor 441; a frequency homing contact assembly 410 has a wiper connected to a suitable source of direct current potential, a plurality of stationary contacts corresponding to the number of frequencies involved in a particular test procedure connected to conductor 449, a "home" contact connected to conductor 488 and a conductor connecting the remainder of the contacts not used in the particular test procedure connected to conductor 473: contact assembly 420 includes a wiper connected to a suitable source of direct current potential, a first stationary contact connected to conductor 469 through conductor 491, a second stationary contact connected to conductor 453, fifth and sixth stationary contacts connected to conductor 465, seventh, eighth and ninth contacts connected to conductor 464 and to conductor 465 through asymmetrical current conducting devices 467 and 466, and tenth and eleventh contacts connected to conductor 465 through conductor 468 and asymmetrical current conducting device 466 and to conductor 464 through asymmetrical current conductor device 467: contact assembly 430 incldues a wiper connected to a suitable source of direct current and a plurality of indicator lights connecting to corresponding stationary terminals for indicating the frequency at which the apparatus is then operative, indicator light 610 indicates that the apparatus is in a ready condition while indicator lights 611, 612 and 613 indicate frequencies of operation of, for instance, 500, 1,000 and 2,000 cycles per second: contact assemblies 440 includes a wiper connected to a suitable source of direct current energy. A plurality of conductors are connected between corresponding stationary contacts on wiper assembly 440 and the stationary contacts on card positioning switch means 125 on FIG. 7 for positioning the card with respect to the printer assembly in the Y or frequency axis of movement.

*Operation*

Referring to FIGS. 3, 4, 5, 6, 7, 8A, 8B, 8C and 9, the apparatus may be energized by an operator by closing on switch 614 connected "out" on contact on relay contact assembly associated with stop relay 310. Through other means (not shown), power supply 10 is energized to provide the necessary power to other portions of the circuit and apparatus including energization of amplifiers, motors and the source of D.C. potential and an indicator light is illuminated for the convenience of the operator. Assuming that the necessary energy is being supplied by the power supply to the various portions of the apparatus, the connection of conductor 426 through contact assembly 359 provides power to the "in" contact on contact assembly 388 associated with tape play relay 301. Switches 61 and 63 are actuated to the "on" position to initiate operation of the tape player 50. Referring to FIG. 4, the actuation of switch means 61 serves to ready the tape player for operation by applying D.C. potential to capstan solenoid 78 and forward clutch solenoid 79 through conductor 60, switch means 61, conductor 71, conductor 74 and resistor 75 and asymmetrical current conducting device 77 to conductor 80 through switch contact assembly 81 to terminal 85 connected to terminal 806 on contact assembly 389 on tape play relay 301 to terminal 806 connected to terminal 86 connected to movable contact on contact assembly 389 and to terminal 87 and through contact assembly 562 on suspend relay 560 and to ground. At this time, the energization of tape play relay 301 serves to complete the circuit to start operation of the tape player. The operator may give verbal instructions to all of the test subjects through the microphone on the control panel to the test station earphones. Conductor 484 on microphone-tape relay is connected through conductor 483 to input terminal 451 on power amplifier 703 when relay 331 is energized. Relay 331 is energized when tape play relay 301 is de-energized through the connection from ground, conductor 808, movable and "out" contacts on contact assembly 390 and conductor 489. To enter the pre-testing interval, the audiometric apparatus is started by the actuation of a pre-test switch 616 which serves to energize tape play relay 301 from a home contact on frequency stepper relay contact assembly 410 through conductor 488 and conductor 458 connected to tape play relay 301. Upon energization of tape relay 301, a holding function is provided through conductor 458, movable and "in" contact on contact assembly 388, conductor 426, contact assembly 359 on stop relay 310 to a source of D.C. The closing of movable contact and "in" contact on contact assembly 389 completes the circuit to ground for the capstan solenoid 78 and forward clutch solenoid 79 on the tape player as shown on FIG. 4 and the portion of the tape indicated by the reference character 90 provides an audio signal of 500 cycles per second for thirty seconds followed by an audio signal of 6,000 cycles per second for fifteen seconds followed by a frequency pulse followed by a stop pulse. Energization of tape play relay 301 actuates contact assembly 390 to complete a circuit from ground through movable contact and "in" contact to conductor 425 in turn connected through movable contact and "out" contact on contact assembly 360 on reset relay 317 to conductor 417 to conductor 416 to provide a ground for listen relay 311, respond relay 312 and frequency relay 313. A further circuit may be traced from conductor 417 through conductor 432 to pulser relay 304 and to the output of pulser amplifier 505 through conductor 476. During this time, while the pre-test audio signals are present, suitable adjustment of the level of the signals for initially adjusting the output of the machine may be made through the use of a level control 607 which is indicated on FIG. 9. The application of the frequency pulse during the pre-test period energizes the frequency relay 313 which supplies a potential through "in" and movable contacts on contact assembly 357 through conductor 442 to frequency stepper relay 333. A D.C. potential from the same source is supplied through movable and "in" contacts on contact assembly 358 through conductor 436 to attenuator "homing" relay 315. Energization and release of frequency stepper relay 333 serves to momentarily open self-interrupting contact assembly 384 and close off-normal contact assemblies 385 and 386. The closure of contact assembly 385 serves to complete a connection from a source of D.C. through conductor 448 to the movable contact on contact assembly 365 on listen-respond relay 318 through the "out" contact of said assembly to conductor 331 connected to listen light indicator 204 on FIG. 5. The closure of contact assembly 386 completes a circuit through conductor 441 to the "out" contact on contact assembly 378 on attenuator homing relay 315. Since relay 315 is energized, the circuit is broken at this contact because of the fact that the movable contact is positioned against the "in" contact for assembly 378.

The source of direct current is connected to the first contact on contact assembly 410 through the wiper which in turn supplies the potential to conductor 449 to test switch 618 connected to the movable contact on contact assembly 367 associated with pulse enable relay 319. The stepping of the wiper on contact assembly 420 serves to connect the source of D.C. current potential to conductor 491 connected to switch 617 and to conductor 469 connected to switch 615. The stepping of contact assembly 430 to the first stationary contact serves to connect the source of D.C. current potential to a "ready" indicator light 619 and the stepping of contact assembly 440 serves to connect a source of D.C. current potential to the contact on frequency card positioning switch assembly 125 connected to control the operation of motor 180 so as to position a card in the Y axis such that the first column may be marked by the printer solenoids. Upon energization of attenuator homing relay 315, a holding circuit is established through the "in" and movable contacts on contact assembly 376, conductor 424 connected to "out" contact and movable contact on contact assembly 361 on reset relay 317 through conductor 422 connected to "out" and movable contacts on contact assembly 355 associated with respond relay 312 to the source of D.C. The closing of the movable and "in" contacts of contact assembly 377 completes a circuit from conductor 419 connected to the source of D.C. to conductor 447 connected to the wiper on contact assembly 340. If the level stepper relay assemblies are not in the "home" position, the D.C. potential supplied through conductor 462 and asymmetrical current conducting device 461 to conductor 460 connected to contact assembly 380 associated with relay 332 serves to energize the level stepper relay until the "home" position is reached. Pre-test switch means 616 is opened (through means not shown) at the time frequency stepper relay advances. The frequency control signal pulse is followed by a stop control signal pulse which serves to energize relay 310 to open moveable and "out" contacts on contact assembly 359 which de-energizes tape play relay 301 by removing the D.C. current potential from the "in" contact on contact assembly 388. The de-energization of tape play relay 301 opens the "in" and movable contacts on contact assembly 389 to halt the operation of the tape player and re-energizes microphone tape relay 331 by closing the movable and "out" contacts on contact assembly 390 to connect relay 331 to ground through conductor 489 and conductor 808. Assuming the record cards are inserted in the card handlers, the apparatus is ready for a test procedure.

A roll call of the test subjects may be taken at this time by use of the intercom microphone and energization of respond indicators 204 on each of the test stations through switch means 617 connected to a source of D.C. at contact assembly 629 and conductor 404. Actuation of any of the switch means will energize lock-out relays 110, 120, etc., corresponding to each remote station to light the indicator lights on card handlers 100.

The test is initiated by the closure of switch means 615 and 618 and opening switch means 617. The actuation of switch means 615 serves to connect the source of D.C. potential connected to the wiper on contact assembly 420 on frequency stepper relay 333 through the first contact connected to conductor 491 in turn connected to conductor 469 and to tape play relay 301 through conductor 458 to energize the same. Energization of the tape play relay 301 serves to close "in" and movable contacts on contact assembly 388 to establish a holding circuit, to close "in" and movable contacts on contact assembly 389 to initiate operation of the tape player, and to close "in" and movable contacts on assembly 390 to connect conductor 425 to ground. The opening of normally closed switch 617 serves to disconnect conductor 404 from the wiper on contact assembly 420 and opens the holding circuits of the card handler lock-out relays 110, 120. The closing of normally open switch 618 completes a holding circuit for relay 319 from the stationary contacts, corresponding to the different frequencies utilized in the test, to the movable contact on contact assembly 367 associated with pulse enable relay 319 through conductor 449 and asymmetrical current conducting device 452.

Appropriate instructions or announcements may be recorded on the test track of the tape between the second stop pulse and before the last described frequency pulse.

Before the application of the listen pulse to listen relay 311, tape play relay 301 is energized and pulse enable relay 319 is energized through conductor 453 connected to the second stationary contact on contact assembly 420 by the second frequency pulse or the control track of the tape. Pulse counter relay 305 and level stepper relay 332 are in the "home" position. The listen pulse from tape player 50 through preamplifier 760, buffer amplifier 302, and amplifier 306, which is adapted to respond to the frequency of the listen pulse, energizes relay 311 through a circuit including conductor 416, conductor 417 through "out" and movable contact on contact assembly 816 on reset relay 317 and through conductor 425 to "in" and movable contacts on contact assembly 390 on tape play relay 301.

The energizing of listen relay 311 performs a number of functions. Specifically, it energizes advance relay 316 and the attenuator level stepper relay 332, opens the holding circuit of the listen respond relay 318, and clears or homes the pulse counter stepper relay 305. In the case of the first listen pulse, however, some of these functions are inoperative or inhibited. The attenuator level stepper is inhibited from advancing by previously energized attenuator homing relay 315 and an open circuit on contact assembly 373 (zero count condition). The energizing of the pulse counter stepper relay 305 is inhibited by the open "out" contact of contact assembly 372. The de-energization of the listen respond relay 318, by breaking the holding circuit, is ineffective because the relay is already de-energized. The only action that occurs is the momentary energization of the advance relay which will be fully explained below in the consideration of the second listen pulse.

Assume that a pulse count of one is placed in the pulse counter during the listen period. The procedure for accomplishing this will be more fully explained below. The next control pulse is a respond pulse. This is received in the same manner as described for the listen pulse except that the path is through amplifier 307 which is adapted to respond to the particular frequency of the respond pulse. This energizes respond relay 312 through conductor 416, conductor 417, through "out" and movable contacts on contact assembly 816 on reset relay 317 and through conductor 425 to "in" and movable contacts on contact assembly 390 on tape play relay 301. The closure of "in" and movable contacts on contact assembly 354 connects a source of direct current to conductor 457, energizing listen-respond relay 318. The holding circuit for relay 318 is completed through "in" and movable contacts of contact assembly 365 of relay 318, through conductors 457 and 414, through the "out" and movable contacts of contact assembly 347, through conductors 415 and 429, through the "out" and movable contacts of contact assembly 362 to a source of direct current. Additionally, the energizing of relay 312 breaks the holding circuit for attenuator homing relay 315 by opening "out" and movable contacts of contact assembly 355. This removes the source of direct current, which was supplied through conductor 418, contact assembly 355, conductor 426, contact assembly 361 of relay 317 and the holding contacts on contact assembly 376 of relay 315. Also, "in" and movable contacts of contact assembly 356 are closed providing circuit continuity between conductor 333 and conductor 332 which are connected to suspend relay 560 through conductor 563 and to conductors 521 and conductor 522 respectively which affect the action of the suspend relay to be described more fully below.

The matter of correct and incorrect test subject responses will be covered later.

Assume now that a second listen pulse is received. The conditions existing at the time of its reception are: attenuator homing relay 315 is de-energized; pulse counter relay 305 has a count of one stored; advance relay 316 is de-energized and its associated capacitor 597 is fully charged; and listen-respond relay 318 is energized. Listen relay 311 is energized by the listen pulse as previously described. Referring first to contact assembly 347, "out" and movable contacts are open, breaking the holding circuit for listen-respond relay 318 allowing it to drop out. The "in" and movable contacts of assembly 347 are closed to complete a circuit which would cause the pulse counter to home except for the temporary energization of advance relay 316 by the discharge of capacitor 597 therethrough. The homing circuit which exists after the drop out of the advance relay is as follows: a source of direct current is connected through "out" and movable contacts of contact assembly 347 through conductor 421 through "in" and movable contacts of contact assembly 372, conductor 455, interrupter assembly 371 to the pulse counter stepper relay 305. Closure of "in" and movable contacts of contact assembly 459 connects the charged capacitor 597 through conductor 405 to relay 316. This pulls in relay 316 momentarily to close the "in" and movable contacts of contact assembly 352 which are in parallel with the "in" and movable contacts of contact assembly 347. It also closes the "in" and movable contacts of contact assembly 353 which completes a circuit through conductor 406 and 455 paralleling the interrupter contact assembly 371 to inhibit the homing of the pulse counter relay until advance relay 316 has dropped out. At this time, the "in" and movable contacts of assembly 353 on advance relay 316 open and the pulse counter stepper relay 305 advances to home position. Closing of "in" and movable contacts of contact assembly 348 energizes the attenuator level stepper relay 332 by connecting a source of direct current through the "out" and movable contacts of contact assembly 362, conductor 429, "in" and movable contacts of contact assembly 373, conductor 434, "in" and movable contacts of contact assembly 348, conductor 433, through the "out" and movable contacts of contact assembly 379, conductor 334, the "out" and movable contacts of contact assembly 545, conductor 335 to attenuator stepper relay 332. This circuit is broken by the pulse counter stepper relay 305 reaching home which opens contact assembly 373 allowing the attenuator level stepper relay 332 to advance one step. Additionally, "out" and movable contacts of contact assembly 351 open the circuit which connects an asymmetrical conducting device in parallel with the coil of relay 305. At the end of the listen pulse, the listen relay is de-energized.

It should be noted that the first listen pulse received at the start of any particular test frequency sequence is prevented from advancing the level stepper because the "out" contact of contact assembly 379 on relay 315 is open. The remainder of the listen pulses associated with each of the group test stimulus signals will serve to energize level stepper relay 332 as contact assembly 373 will be closed at the time the listen pulse is received except in the zero count condition. This serves to inhibit the advance of attenuator level stepper relay 332 following a zero pulse group.

Following the listen pulse, as shown on the tape, zero to four test stimuli pulses are supplied to the input of the filter relay 504 from audio preamplifier 730 connected to the output of tape player 50. The output of filter relay 504 is connected through conductor 474, having terminal 450 thereon, to pulse amplifier 505. Terminal 450 is also connected to the input of contact assembly 320 and its associated resistor array through conductor 810 and the variable resistance 805 which is a part of the Raysistor. The output of pulse amplifier 505 is applied to pulser relay 304 through conductor 476 and thence to ground through conductor 432, conductor 417, contact assembly 816 on reset relay 317, conductor 425, "in" and movable contacts on contact assembly 390 on tape play relay 301 and conductor 808 connected to ground. Each time a pulse is present, pulser relay 304 is energized for the duration of the pulse. Energization of pulser relay 304 closes the "in" and movable contacts on contact assembly 381 to connect a source of direct current to conductor 444 connected to pulse counter relay through asymmetrical current conducting device 445, conductor 446, movable and "in" contacts on contact assembly 368 on pulse enable relay 319, conductor 454, resistor 469 connected in parallel to "out" movable contacts of contact assembly 370, to pulse counter relay 305. The source of radiations 632 is also connected between conductor 444 and ground through conductor 477 and zener diode 478. Lamp 632 is mounted in proximity to variable resistance 805 to irradiate the same so as to vary the resistance thereof in a manner as to gradually reduce the series impedance of variable resistor 805 during the leading portion of the pulse being applied to the attenuator assembly associated with contact assembly 320. Energization of pulser relay 304 also serves to connect the wiper of contact assembly 320 through conductor 486, movable and make before break "in" contacts on contact assembly 382, conductor 479, "out" and make before break "in" contacts of contact assembly 383 if microphone-tape relay 331, conductor 483 to terminal 451 connected to the input of power amplifier 703. It may be noted that the input terminal 451 of power amplifier 703 is, in the absence of pulses of test stimuli, connected to ground through the "out" and movable make before break contacts on contact asembly 382 through conductor 485, conductor 588 and a portion of the attenuator resistance array associated with contact assembly 320. Pulse counter 305 is operable in response to each pulse to step the wipers associated with contact assemblies 400, 401, 402 and 403 one step for each pulse to stationary contacts thereon corresponding to the number of pulses received. It may also be noted that off-normal contact assemblies 372 and 373 are actuated. The pulses are simultaneously applied to the input of power amplifier 703 from contact assembly 320 through terminal 451. The output of power amplifier 703 is connected through cables 32 and 33 to connectors 35 on the individual remote test stations to either the right or left ear transducers 218 or 219 on headset assemblies 201. Terminals 480, 481 and 482 on FIG. 8C correspond to terminals 480, 481 and 482 on FIG. 5 and, as will be explained below, the signal is applied to either the right or left ear of a test subject in accordance with the energization status of ear relay 704. In the present example, four pulses are included in the test group stimulus and therefore the wiper on contact assembly 403 on pulse counter relay 305 is connected to conductor 404 and to conductor 230 (FIG. 5) through terminal 814. This provides an enabling circuit for the actuation of response switch 205 as will be explained below. Following the audio test stimuli pulses, a respond pulse appears on the control signal track of the tape and is applied to control preamplifier 760, buffer amplifier 302 and respond amplifier 307 to energize respond relay 312. Energization of respond relay 312 provides a connection through the "in" and movable contacts on contact assembly 354 from the source of direct current through conductor 457 to energize listen-respond relay 318.

Energization of listen-respond relay 318 closes "in" and movable contacts on contact assembly 364 to establish a holding circuit through conductor 414, "out" and movable contacts on contact assembly 347 on listen relay 311 through conductor 415 and 429 to the source of direct current connected to the movable contact on contact assembly 362 on reset relay 317. The movable and "in" contact on contact assembly 356 are closed to complete a circuit from suspend relay 560 (FIG. 6) through conductor 563, conductor 333, contact assembly 356, and conductor 332 connected to movable contact on contact assembly 525 on repeat relay 520 (FIG. 6). Energization of the listen-respond relay 318 connects the movable contact to the "in" contact on contact assembly 365 to connect conductor 404 to the source of direct current through contact assembly 385 on frequency stepper relay 333 through conductor 471 and conductor 448 to apply current to respond indicator light 203 on remote station 200 through conductor 225 and to supply power to conductor 115 connected to lock-out relay 110 and conductor 137 connected to the movable contact on contact assembly 112 for lock-out relay 110 (FIG. 7). The energization of listen-respond relay 318 opens the circuit between the "out" and movable contacts of contact assembly 365 removing the source of direct current from conductor 331 which turns off the listen indicator light 204 on remote station 200. Actuation of contact assembly 366 opens the circuit between conductors 338 and 339 connected to repeat relay 520 and contact assembly 524 and contact assembly 515 on noise relay 503 (FIG. 6). During the respond period, the test subject actuates one of the switches, which are numbered reading from left to right, 4, 3, 2, 1 and 0, corresponding to the number of pulse stimuli received in the stimulus group of the previous listen period. Assuming the response is the correct one, in the present example switch means 205 is actuated to apply the source of direct current from the wiper on contact assembly 403 (FIG. 5) to the lock-out relay 110 through conductor 210 (FIG. 5) to conductor 138 (FIG. 7) through movable and "out" contacts on contact assembly 111 to relay 110. There being a source of D.C. of the same polarity connected to the other side of lock-out relay 110, it remains deenergized. Simultaneously conductor 230 is connected to conductor 211 (FIG. 5) and to conductor 136 (FIG. 7) to energize printer solenoid 130 through movable contact and "out" contact on contact assembly 113 to energize the solenoid through resistor 132 and conductor 133 connected to ground conductor 135. The printer solenoid will be operative to place an indication of the response at the appropriate place on the card in accordance with the position of the card in the card handler and the position of the printer solenoid with respect to the card. Assuming an incorrect response is made, the actuation of any of the switch means 206, 207, 208 and 209 serves to provide a ground connection for lockout relay 110 through conductor 210 and conductors 227, 228, 229 or 235 each of which is connected to ground either through the stationary contacts connected to ground (not shown) on contact assembly 400, 401, 402 and 403 on pulse counter relay 305 or conductor 226 in remote test station 200. The energization of lock-out relay 110 completes a holding circuit through "in" and movable contacts on contact assembly 111 to ground conductor 135, connects response indicator lamp 134 on the card handler to conductor 404 through "in" and movable contacts of contact assembly 112 and conductors 139 and 137, and opens movable and "out" contacts on contact assembly 113 to prevent energization of the printer solenoid. Any further attempts to vote will not be recorded.

The test for the particular frequency under consideration then continues for each of the levels being tested. The pattern followed is from 70 db above audiometric 0 in 10 db steps to 0 and then in interlaced fashion from 5 db to 65 db in 10 db steps comprising a total of fifteen test levels for each frequency. For a given frequency, the level stepper is moved ahead one position for each listen pulse received except when the "out" and movable contacts of contact assembly 379 on relay 315 are open (at level 70 db) or when the contacts of contact assembly 373 are open (following a zero stimulus group) or when the "out" and movable contacts of contact assembly 545 on memory relay 540 (FIG. 6) are open ("repeat" condition), and the pulse counter is homed between test group stimulus signals except following a zero stimulus group when it is already home and is responsive to enable particular response switches in accordance with the number of stimuli pulses present in each stimulus group.

As stated above, a test for a particular frequency consists of a total of fifteen test levels. It is apparent then that fifteen complete test stimulus groups must be recorded on a magnetic tape to test fifteen levels. Additional stimulus groups without any pulses, known as "0" groups, may be provided. In addition, if it becomes necessary to repeat one or more levels, there will be insufficient groups on the tape to complete fifteen level tests at the particular test frequency. Therefore, additional groups may be recorded on the tape to allow for such repeat conditions. To illustrate, assume that a tape has been prepared which has eighteen stimulus groups and an "0" group for each frequency to be tested. In this example, three repeats could be encountered and a complete fifteen group test could still be performed. If no repeats are required, there will be three more groups on the tape than there are test positions. Under this condition, the operation is as follows: contact banks 320, 330, 340, 350 and 360 of attenuator level stepping relay 332 contain twenty positions each, or five more than are required for a fifteen group test. The appropriate contacts are so wired that when the extra groups up to a maximum of five are encountered, relay 332 continues to advance one step for each listen pulse as previously described except that the appropriate contacts are adapted to maintain the test level and the card handler printers the position of the last, or fifteenth test level. By this means the extra groups remaining on the tape, if any, after the performance of the fifteen level test, are used up by retesting the test subjects at the fifteenth test level. When all stimulus groups have been so used, a frequency pulse on the control track of the magnetic tape pulls in frequency relay 313 which in turn advances the frequency stepper relay 333 one step, as previously described, and energizes the attenuator homing relay 315 which in turn advances the attenuator level stepper to the first, or 70 db level position preparatory to the next test frequency. If more repeats are performed than there are groups on the tape, the frequency pulse will arrive before the fifteen levels of the test have been performed at which time the attenuator level stepper 332 will advance to the first level, or 70 db, position even though the previous test is not completed on the record. To prevent misinterpretation of this condition an indicator light is provided on control panel 600 which is energized to indicate this condition. The means by which the attenuator level stepper relay 332 is returned to the 70 db level or home position is as follows: the frequency pulse energizes frequency relay 313 through amplifier 380 which is responsive only to frequency pulses. This closes the "in" and movable contacts of contact assembly 358 which applies a source of direct current to attenuator homing relay 315 through conductor 419 and the closed contacts. The energization of relay 315 closes the holding circuit therefor as described above. A source of direct current is then supplied to home the attenuator stepper relay 332 through conductor 419, the "in" and movable contacts of contact assembly 377 on relay 315 through conductor 447 and the stationary contacts of contact assembly 340 of relay 332, through the interrupter contact 380 to relay 332. Relay 332 advances until the contacts of contact assembly 340 are open. Also connected to stationary contacts, numbers 2 through 14, of contact assembly 340 is an asymmetrical current conducting device 463 and conductor 314 which is connected through conductor 571, "out" and movable contacts of contact assembly 574, and conductor 573 to excess repeat relay 570 (FIG. 6). If homing occurs during positions 2 through 13 indicating that an incomplete test has been run at that frequency, the excess repeat relay will become energized and in turn will energize indicator light 603 on control panel 600. In the event that the homing sequence occurs during positions 14 to 20 on contact assembly 340 the source of direct current to the excess repeat relay 570 is blocked by asymmetrical current conducting device 461 and the relay will not be energized.

Ear relay 704 is operable to supply the test group signals to left earphone portion 219 through conductor 800 contact assembly 393 and conductor 803 connected to terminal 482 and through conductor 801 connected to terminal 481 through conductor 805 and contact assembly 394. The balance of the circuit, common to both earphones, is conductor 214, through terminal 480 and through conductor 801 to amplifier 703. It may be noted that the portion of the earphone, left or right, is short-circuited to minimize spurious stimuli in the "off" portion. Upon energization of the ear relay from contact assembly 420 on frequency stepping relay 333, the signal is applied to the right earphone portion 218 of the headset. Conductor 464 connects relay 704 to stationary contacts on contact assembly 420 at positions corresponding to the last five test frequency columns, contacts 7, 8, 9, 10 and 11, on the record card 40 and these are energized by frequency stepper relay 333 under control of the frequency pulses on the control signal track of the tape to position the contact wiper, connected to a source of direct current, on the respective stationary contacts. It may be noted that the last two of the stationary contacts utilized to energize the ear relay are connected through diode 467 so as to allow use of the same stationary contacts for energization of the filter relay.

The filter relay is energized during the last two, or highest test frequencies for each ear, namely, those of 4,000 and 6,000 cycles from the stationary contacts corresponding to these frequencies on contact assembly 420. For the first set of frequencies for instance, the left ear, a direct connection is made to the stationary contacts on contact assembly 420 and for the last two frequencies of the right ear test connection is made through conductor 468 and asymmetrical current conducting device 466 through conductor 465 connected to filter relay 504. The purpose of the filter relay is to connect filtering elements 493 in and out of circuit with the pulse stimuli signals so as to eliminate possible influence of subharmonic and lower frequency noise from influencing the test subject when testing at the higher test frequencies. A further filtering network, 492, is connected permanently in the connection to audio preamplifier 730 to eliminate subharmonics and noise, in the present embodiment, below 200 cycles per second. Filter element 493 is designed to eliminate frequencies below the 3,000 cycle per second level.

If, during a test, a noise is present in the area in which the remote test subject stations 200 are located, noise microphone 501 in FIG. 6 will provide an electrical signal to noise amplifier 502 through conductors 510 and 511. The output of amplifier 502 will energize noise relay 503 in response thereto to close the "in" and movable contacts on contact assembly 515 associated therewith which in turn connects conductor 339 through conductor 508 to conductor 337. Conductor 337 (FIGS. 8A and 8B) is connected to the stationary contacts on contact assembly 330 corresponding to positions of level stepping relay 332 which provide an output at and below 45 db and when in this position, the wiper thereof connects conductor 337 to a source of direct current. Conductor 338 on repeat relay 520 is connected to contact assembly 366 on listen-respond relay 318 and when the apparatus is in the listen-mode for transmission of an audio stimulus group, the movable and "out" contacts thereof complete a circuit from conductor 339 to conductor 338 to energize repeat relay 520. Energization of repeat relay 520 provides a holding connection to conductor 339 through "in" and movable contacts on contact assembly 524. The movable contact on contact assembly 525 is connected to the source of direct current through conductor 527 and conductor 332 (FIG. 8A) is connected to conductor 521. Actuation of contact assembly 526 closes a circuit through movable and "in" contacts from the source of direct current to memory relay 540. "Repeat" indicator 604 on control panel 600 is conected to relay 540 through conductor 543. Energization of memory relay 540 connects "in" and movable contacts on contact assembly 544 through conductor 547 to conductor 336 (FIG. 8) which is in turn connected to the "out" contact on contact assembly 348 associated with listen relay 311. This establishes a holding circuit therefor when contact assembly 373 is closed, i.e., one or more counts stored in pulse counter stepper relay 305. The circuit normally completed by movable and "out" contacts on contact assembly 545 is opened, these contacts are connected to conductors 334 and 335 to open the energization circuit for level stepper relay 332 to inhibit advance thereof. If the noise continues into the period of the following respond pulse, suspend relay 560 is energized through "in" and movable contacts of contact assembly 356 associated with respond relay 312 and conductor 333. The energization of suspend relay 560 completes a circuit through "in" and movable contacts on contact assembly 561 and conductors 522 and 521 to the movable contact on contact assembly 525 associated with repeat relay 520 to establish a holding circuit therefor. The opening of movable and "out" contacts on contact assembly 562, connected to terminals 87 and 88 (FIG. 4) serves to stop the operation of tape player 50, thus suspending further testing. When the noise level has decreased to a predetermined value, noise relay 503 is de-energized, releasing the holding circuit for repeat relay 520 which in turn de-energizes suspend relay 560 to restart tape player 50 if it was energized as described above. However, memory relay 540 will remain energized through its holding circuit to prevent operation of level stepping relay 332 so that a test group stimulus will be repeated at the level during which the noise occurred.

It may be noted that the next stimulus group on the tape, which will be used for the repeat function, may have a different number of audio test stimuli pulses from the test group in progress when the noise occurred. Memory relay 540 will be de-energized during the next listen pulse from the control track on the tape by the opening of contact assembly 373 and the test will proceed as outlined above. Should an excess number of repeats of test stimulus groups be necessary, the excess repeat relay will be energized when the frequency pulse for the next frequency sequence is received. The frequency pulse energizes frequency relay 313 which in turn energizes attenuator homing relay 315. The "in" and movable contacts of contact assembly 377 connect the wiper on contact assembly 340 to conductor 419 through conductor 447 through any one of the contacts assembly 340 connected to conductor 462 through asymmetrical current conducting device 463 to conductor 314 connected to excess repeat relay 570 through conductor 571 (FIG. 6) and "out" and movable contacts on contact assembly 574 through conductor 573. Energization of excess repeat relay establishes a holding circuit through "in" and movable contacts on contact assembly 574 from the source of direct current through normally closed switch means 605. An excess repeat indicator light 603 on control panel 600 is energized through movable and "in" contacts on contact assembly 575. This provides an indication to the operator that the full test sequence for the previous frequency was incomplete. If the omissions are observed to be insignificant from the standpoint of obtaining a valid test, the operator may allow the rest of the test to continue and may extinguish the excess repeat light and de-energize relay 570 by opening switch means 605.

If, at any time during a test sequence, it becomes necessary to stop the test, reset relay 317 may be energized by closing normally open switch means 606 connected to a source of D.C. current. Relay 317 is energized through conductor 431 connected to switch 606 and through conductor 423 connected to ground through test switch contacts 629. Test switch contacts 629 are provided to prevent the operation of the reset relay at any time other than during the actual test procedure. Energization of reset relay 317 closes the movable contact and "in" contact on contact assembly 816 through conductor 423 and conductor 425 connected to "in" and movable contacts on contact assembly 390 associated with tape play relay 301 which completes the holding circuit for relay 317 and opens the circuit between the movable and "out" contacts on contact assembly 816 for the ground connection through conductor 417 to listen, respond and frequency relays 311, 312 and 313 and through conductor 432 for pulser relay 304. Opening of the connection between the movable and "out" contacts on contact assembly 361 disables the holding circuit for the attenuator homing relay and actuation of contact assembly 362 connects the homing contact assembly 371 on pulse counter relay 305 to the source of direct current through conductor 411 and conductor 421, "in" and movable contacts on off-normal contact assembly 372 and conductor 455. When the pulse counter relay 305 is in the home position, conductor 421, energized with direct current, is connected to contact assembly 380 on level stepper relay 332 through conductor 427, "in" and movable contacts on contact assembly 362, conductor 428, "out" and movable contacts on contact assembly 377, conductor 447, wiper and stationary contacts on contact assembly 340 and conductor 460 to home relay 332. After level stepper relay 332 has homed through its self-interrupting contact assembly 380, the wiper of assembly 340 is connected to the home stationary contact which in turn supplies the direct current to the self-interrupting contact 384 on frequency stepper relay 333 through conductor 443, movable and "out" contacts on contact assembly 387 on attenuator homing relay 315, conductor 441, the movable and stationary contacts on off-normal contact assembly 386, conductors 472 and 473 and contact assembly 384 thus homing relay 333. The reset relay 317 holding circuit is opened when the tape play relay is de-energized as described above.

The tape player is initially started by actuating switch contact assembly 61 and 63 from the "off" (or stop-position shown on FIG. 4 of the drawings to an "on" (or play) position which serves to energize capstan solenoid 78 and forward clutch solenoid 79 when tape play relay 301 is energized. When the tape reaches the end, switch 84 is closed to energize relay winding 83 which in turn closes associated contacts 89 and 82 and opens contact 81 to de-energize the capstan solenoid 78 and forward clutch solenoid 79. The closure of contact 89 serves to energize rewind clutch solenoid 65 through normally closed contact 68 associated with relay winding 66. When the tape if fully rewound, switch 69 is closed to energize relay winding 66 which in turn opens its normally closed contacts 68 and 73 to de-energize the rewind clutch solenoid and relay winding 83 respectively returning the tape player to the play condition.

Discharge of capacitor 90 through conductor 64, relay winding 66, switch 69 and to ground maintains relay winding 66 energized momentarily allowing tape reel to decrease its angular velocity before capstan solenoid 78 and forward clutch solenoid 79 are re-energized.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. Audiometric testing apparatus comprising, in combination; a source of audio signal including a recording medium upon which is recoded a plualrity of first signals of predetermined duration and frequency, said signals being recorded in groups of random numbers of pulses and a second signal recorded in predetermined position with respect to said first signal and being of predetermined frequencies and duration; control means connected to said source of signal and including means for successively attenuating said first signal in response to said second signal, means responsive to the number of pulses in a group of said first signal for selectively energizing corresponding subject operated switching means and means responsive to said second signal for selectively energizing and de-energizing a recording means; recording means connected to said control apparatus and to a subject station; and at least one subject test station including a plurality of switching means connected to said recording means and to said means for selectively energizing a predetermined switch means therein and including means for selectively supplying said attenuated signal to the auditory sense organs of a subject.

2. Audiometric testing apparatus comprising, in combination; a tape play; a tape therefor having a plurality of tracks for providing control and test signals, and said test signals being of predetermined frequency amplitude and duration and said control signals being of predetermined differing frequencies and duration; control apparatus connected to said tape player and including means for affecting the level of said test signal in response to said control signal so as to provide a characterized subject test signal, means responsive to the test signal for providing an output in accordance with said test signal, recording means connected to said control apparatus; and at least one subject test station including a plurality of switching means and being connected to said recording means and to said control apparatus whereby one of said switching means may be operable in response to the output signal of said means having an output in accordance with said test signal, and means for supplying said test subject signal to the auditory sense organs of a subject.

3. The apparatus of claim 2 in which a means responsive to the presence of noise in proximity to a subject station is connected to the control means for inhibiting the operation of said control means when the noise level exceeds a predetermined value.

4. In audiometric testing apparatus, the combination comprising; a source of signal including first and second signal channels, said first channel being comprised of a plurality of groups of random numbers of pulses of predetermined duration and frequency, said second channel being comprised of a plurality of pulses of predetermined frequencies and duration, the signals in said first and second channels being recorded in predetermined registration with respect to each other; and means responsive to said second signal for selectively and successively applying said first signal to the auditory sense organs of a test subject.

5. In audiometric testing apparatus, the combination comprising; a source of signal including first and second channels, the first channel being comprised of a plurality of groups of random numbers of pulses of predetermined duration and frequency said second channel being comprised of a plurality of pulses of predetermined frequency and duration, the signals in said first and second channels being recorded in predetermined registration with respect to each other; and attenuation means operable in response to said second signal for successively affecting the level of said first signal to be applied to the auditory sense organs of a test subject.

6. The apparatus of claim 5 in which the attenuator means is operable to provide equal increments of descending levels of output to a predetermined minimum level followed by equal increments of ascending steps to a maximum level.

7. Audiometric testing apparatus comprising in combination; first and second sources of signal recorded on a dual track tape, one of said signals being of suitable predetermined frequency for testing the auditory response capabilities of a subject and the other of said signals being of suitable differing frequencies recorded in predetermined relationship to said first source of signal; a plurality of subject testing stations each including means for applying a test signal to the auditory sense organs of the subject, indicator means and means operable by said subject for registering a response to said signal; response recording apparatus responsive only to a correct response by said test subject to record an indication thereof; and control apparatus interconnecting said source of signal, said recording means and said subject test station.

8. The apparatus of claim 7 in which the control apparatus includes means for inhibiting the transmission of a signal to the test station in response to the source of signal for testing the auditory response capabilities of a subject.

9. The apparatus of claim 7 in which the response recording apparatus is operable in response to the other of said sources of signal to position a recording medium and apparatus for recording correct responses thereon in accordance therewith.

10. The apparatus of claim 7 in which the control apparatus includes inhibiting means therefor responsive to presence of undesirable noise at the subject test station above a predetermined level.

11. In an audiometric testing apparatus, the combination comprising; a source of stimulus groups of pulses of test signal of predetermined frequency and duration, said groups being recorded with random numbers of pulses; means for applying said signals to the auditory sense organs of a test subject; recording means operable by said subject for indicating a correct response to the number of pulses in a particular test group; and means interconnecting said recording means and said source of signal for inhibiting the operation of said recording means whereby said recording means is operable to record a response only in accordance with the number of pulses in said test group.

12. The apparatus of claim 11 in which the stimulus groups include at least one group having no pulses.

13. The apparatus of claim 11 in which means are provided for affecting the level of test signal applied to the test subject whereby successive stimulus groups applied to the test subject differ from preceding stimulus groups by equal increments of amplitude and proceed from a maximum to a minimum and back to a maximum level.

14. In audiometric testing apparatus, the combination comprising; means within a test area responsive to the presence of the undesired signals above a predetermined level; means responsive to the output of said means for inhibiting a test in progress in response to the output of said first named means, said means being operative upon a reduction in the noise below said predetermined level for repeating the portion of the test in progress; and means for terminating said test when said noise is present longer than a predetermined time.

15. In audiometric testing apparatus the combination comprising; recording apparatus for recording responses of test subjects to test stimulus signals of varying characteristic, said recording means including a plurality of printing devices, each having inhibiting means connected thereto; a plurality of subject operable response signal generating devices, each connected to one of a plurality of response indicating means corresponding to differing characteristics of said test signal; and circuit means, responsive to said test signals, connected to said recording means and to said response means whereby said printing means is operative to record a response only when the correct response signal generating means is actuated by said subject and is inhibited by said inhibitor means when an incorrect response signal generating means is actuated.

16. Audiometric testing apparatus comprising, in combination; a prerecorded source of signal including a plurality of groups of a first signal, each of said groups having a different number of pulses of predetermined frequency, duration and amplitude, a second plurality of signals of differing frequencies of predetermined duration and in predetermined registration with said first source of signal; means for selectively applying a signal proportional to said first signal to one or the other audio sense organs of a test subject; variable signal transmitting means interconnecting said first signal to said last named means; recording means; means responsive to said first and second signals for selectively energizing said recording means in accordance with said first and second signals; means operable by a test subject in response to the presence or absence of an audible signal for recording a response thereto; circuit means connecting said last named means to said recording means and to said means responsive to said first and second signals; and circuit means interconnecting said first source of signal to said means for applying said signal to said subject.

17. In apparatus of the class above described, the combination comprising; a source of audible test signals for application to the auditory sense organs of a test subject; means for applying said signal to said test subject in variable steps and at varying frequencies; and means operable at frequencies of said source of signal above a predetermined value for inhibiting the transmission of signals below a predetermined frequency.

18. In apparatus of the class above described, the combination, comprising; a plurality of sources of signals, including a first signal of varying frequency and a second signal comprised of a plurality of frequencies; means connected to said source of signal for applying said first signal to the auditory sense organs of a test subject; means operable by said test subject for supplying a further signal indicative of the signal sensed by said subject; means responsive to said second signal for selectively energizing a recording means connected to said means operable by said subject in accordance with the signal supplied to said subject whereby the means operable by said subject is operative to energize said recording means only when the signal sensed by said subject is in correspondence with the signal applied to said subject.

19. Audiometric testing apparatus comprising, in combination; a first source of audio signal comprised of a plurality of stimulus groups of random numbers of pulses of predetermined amplitude and duration; a second source of signal operable in synchronism with first source of signal including a plurality of pulses of predetermined frequency and duration; means for supplying a test signal to a plurality of subjects; means interconnecting said first source of signal to said means for supplying a test signal to said subjects, said means including means responsive to said second signal for varying the amplitude of said first signal in accordance with said second signal; response signal generating means corresponding to each of said stimulus groups of first signal for each subject; recording means connected to said response signal generating means; and means connected to said second source of signal and to said response signal generating means and said recording means for providing recording of only a correct response to the first signal group being transmitted to a test subject.

20. The apparatus of claim 19 in which the first and second sources of signal are provided on a single recording medium.

21. In apparatus of the class above described, the combination, comprising; a source of signal comprised of a plurality of groups of random numbers of pulses of predetermined amplitude and duration; means for applying said signal to the auditory sense organs of a test subject; means interconnecting last named means and said source of signal, said means including further means operable in response to each of said pulses for energizing said test subject means only when a pulse is received from said source of signal; and means responsive to the ambient noise in proximity to said test subject for inhibiting the application of said signal to test subject when the level of the noise exceeds a predetermined value and including means for providing a signal to replace signals occurring during the presence of noise so as to allow completion of a complete test.

22. Audiometric testing apparatus comprising, in combination; a source of signal including a tape player and a tape therefor; said tape including a test program comprised of a plurality of groups of random pulses of predetermined duration and amplitude on a first track in registration with a further plurality of signals of varying frequency and predetermined duration provided on another track on said tape; pulse counter relay means operable in response to the number of pulses in a test stimulus group to position its movable contacts in accordance therewith; level stepping relay means, responsive to one of said control signals for providing a plurality of outputs in accordance with the total number of control signals applied thereto, a first of said outputs being of variable amplitude in steps proceeding from a maximum to a minimum and to a maximum of said stimulus groups pulses and a second of said outputs for controlling the operation of a movable recording means; frequency stepping relay means responsive to another of said control signals to position its contacts in accordance therewith and having a plurality of outputs including an output for controlling the position of a movable recording medium; circuit means connecting each of said relay means to the output of said tape player; a recorder including means for positioning a plurality of recording devices in accordance with the second output of said level stepping relay means and means for positioning a recording medium in accordance with the output of said frequency stepping relay means, said recording devices being responsive only to a signal indicative of a correct response by a test subject to record said response; circuit means interconnecting said recording means to said level stepping relay means and to said frequency stepping relay; at least one subject test station including means for applying test stimulus groups to a test subject and a plurality of switch means corresponding to the combinations of pulses in said test stimulus groups for actuation by said test subject in response to a test stimulus group; circuit means interconnecting the output of said pulse counter relay means to said switch means whereby only one of said switch means is operable to record a response corresponding to the particular test stimulus group applied to said subject; circuit means connecting said switch means to said recording device; and circuit means connecting said means for applying test stimulus groups signals to the auditory sense organs of a test subject to the first of said outputs on said level stepping relay means.

23. The apparatus of claim 22 in which the application of test stimulus groups to the auditory sense organs of the test subject is inhibited in accordance with the presence of noise above a predetermined level in proximity to said test subject.

24. The apparatus of claim 23 in which further means, responsive to the presence of noise above a predetermined level in proximity to a test subject are operable to inhibit the application of the test stimulus groups to the subject during the presence of said noise and for inhibiting the operation of said level stepping relay during such interval whereby the testing of said test subject is continued at the level at which the noise first occurred.

References Cited by the Examiner

UNITED STATES PATENTS

| | | | |
|---|---|---|---|
| 1,661,751 | 3/1928 | Fletcher | 181—.56 |
| 2,394,569 | 2/1946 | Strommen | 181—.56 |
| 2,511,482 | 6/1950 | Shaper | 181—.56 |
| 2,537,911 | 1/1951 | Reger | 181—.56 |

BENJAMIN A. BORCHELT, *Primary Examiner.*

CHESTER L. JUSTUS, SAMUEL FEINBERG,
*Examiners.*